Figure 1:
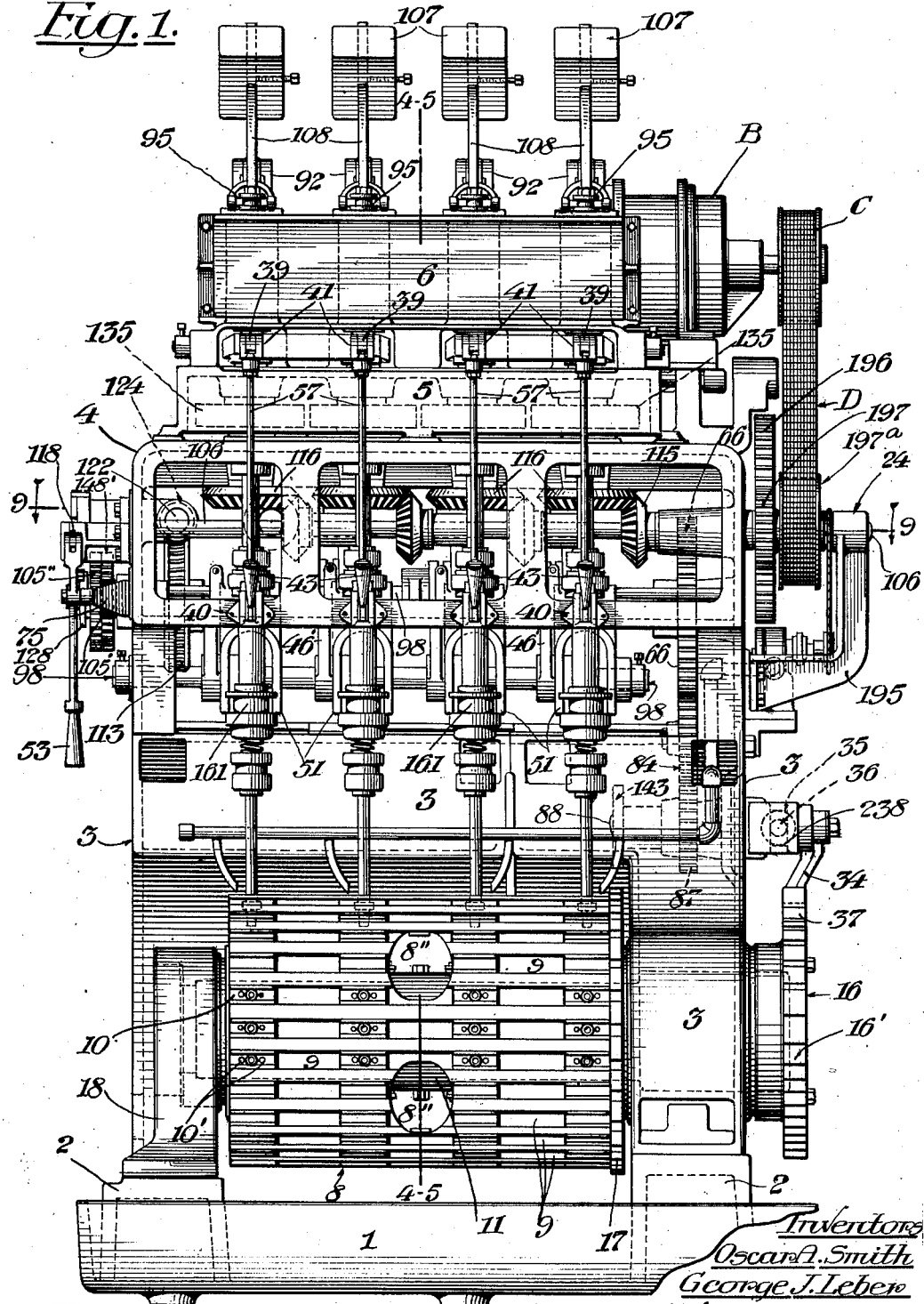

Feb. 16, 1926.

O. A. SMITH ET AL 1,573,099

NUT TAPPING MACHINE

Filed Jan. 17, 1922    15 Sheets-Sheet 6

Inventors,
Oscar A. Smith
George J. Leber
by their Attorneys.

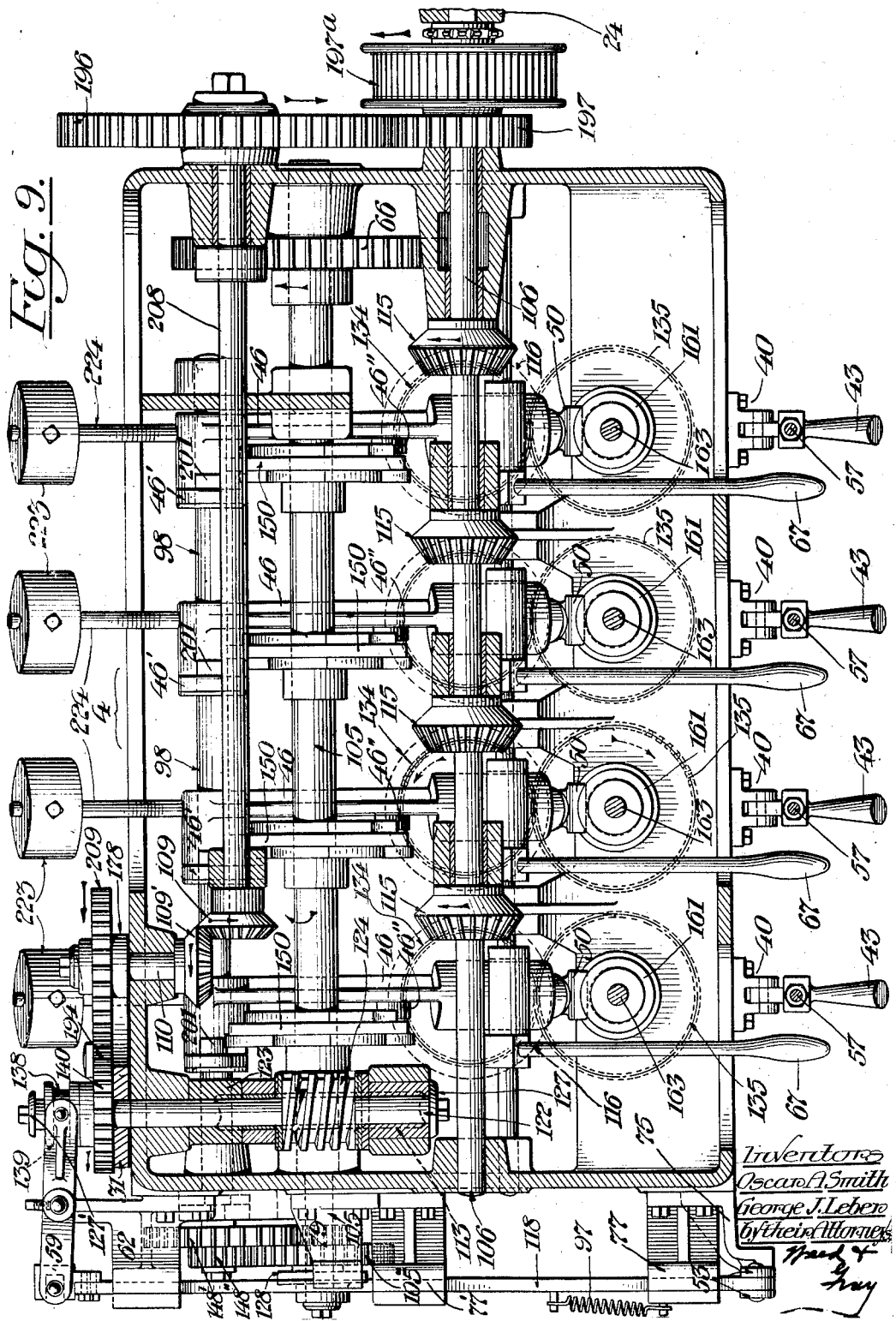

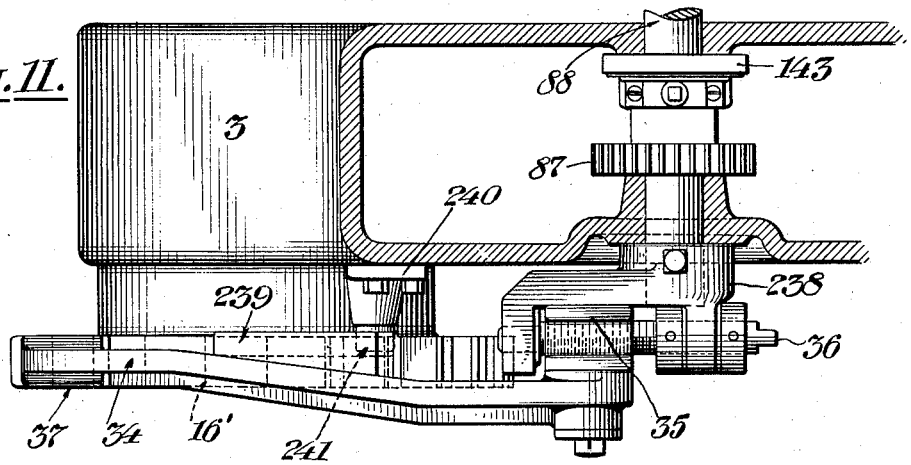
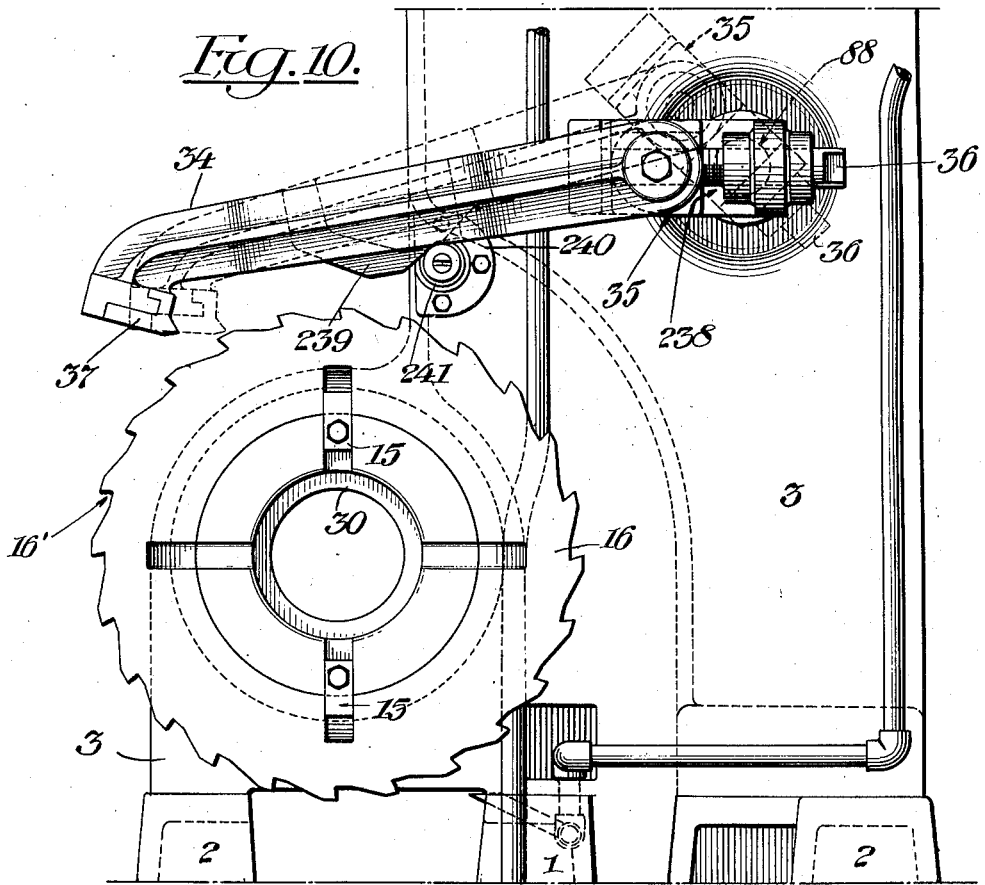

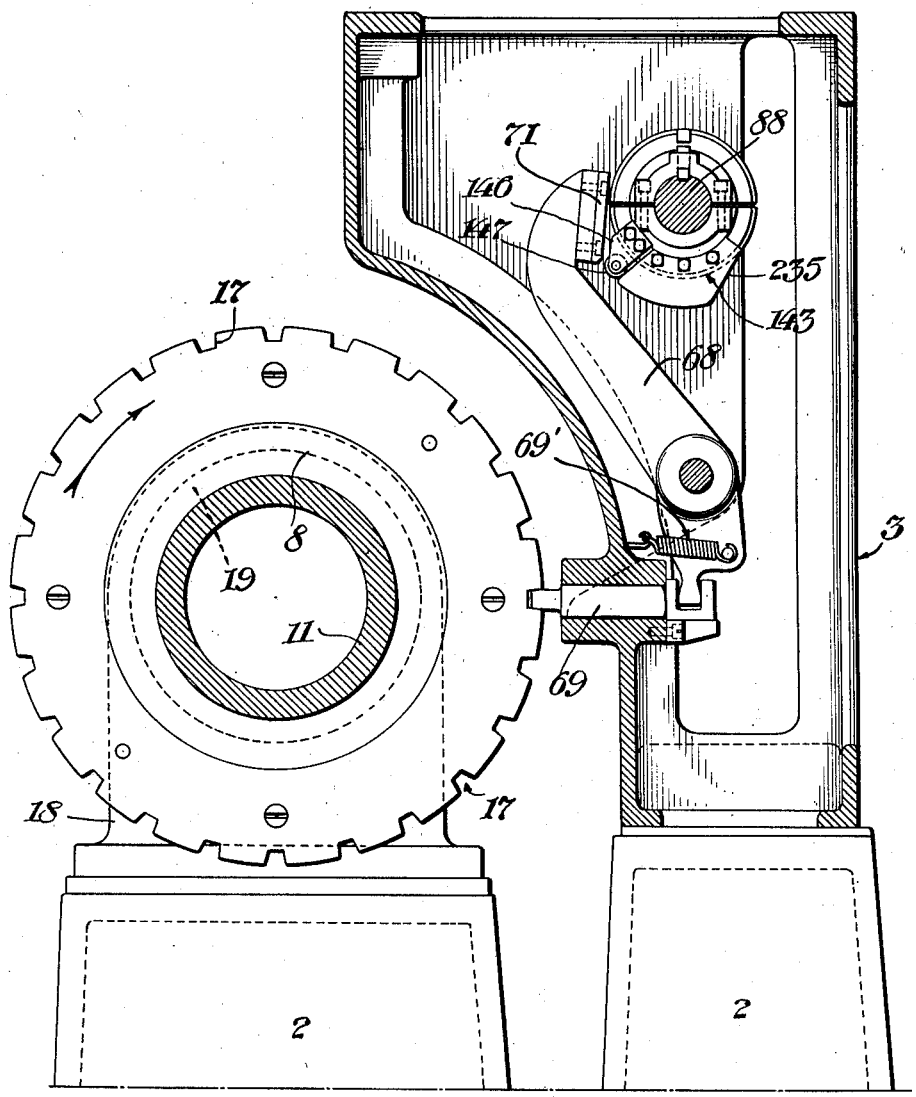

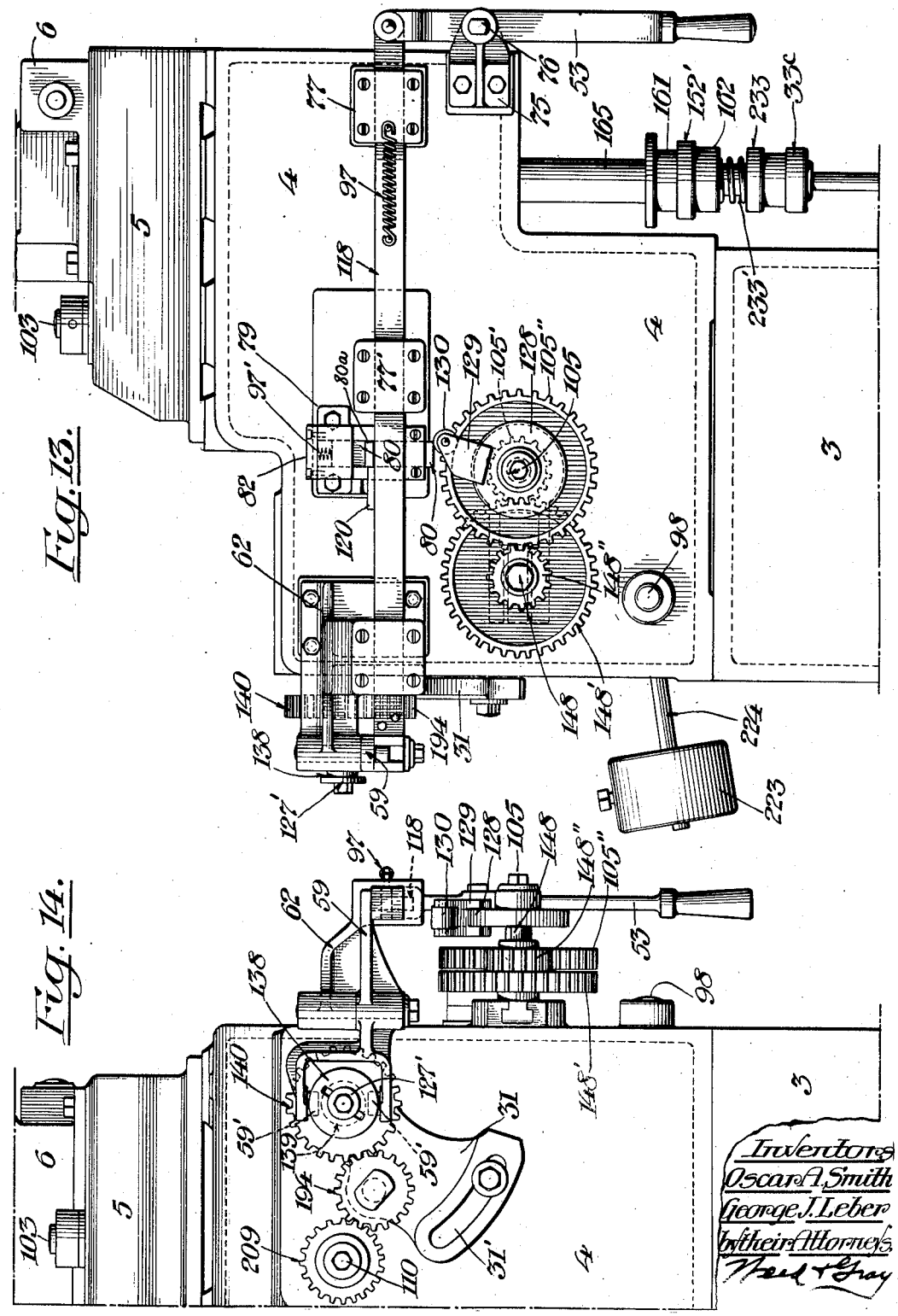

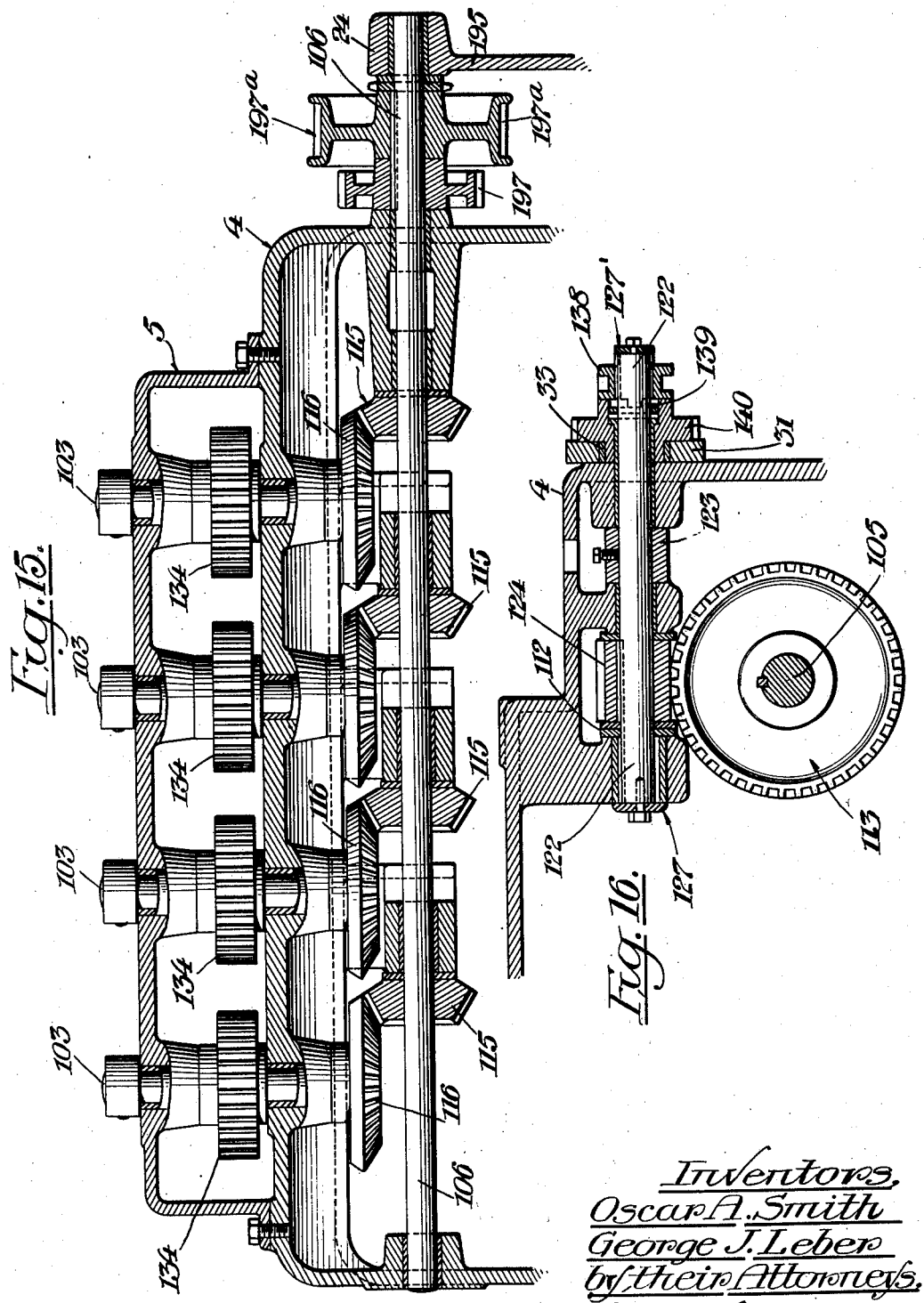

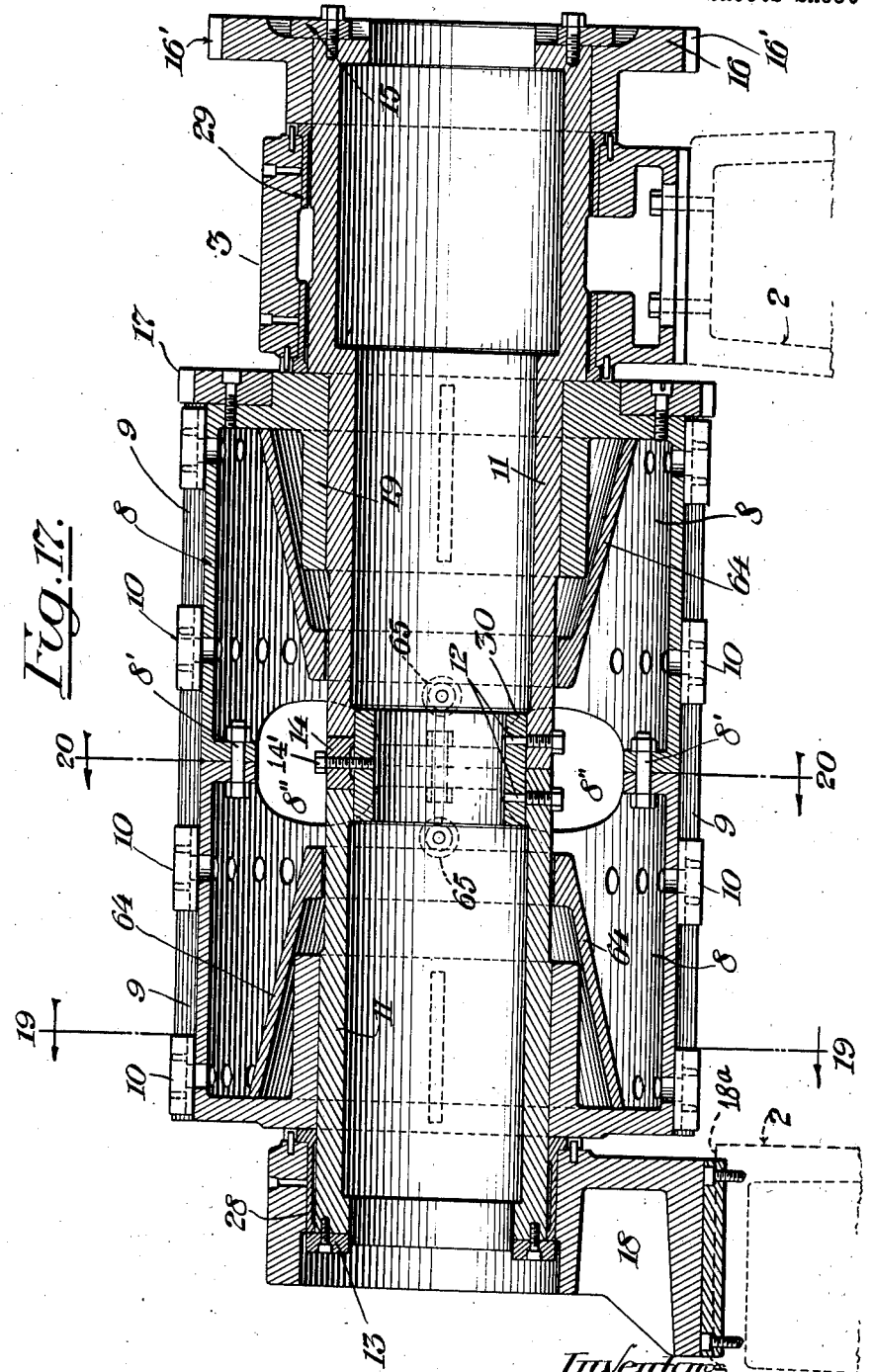

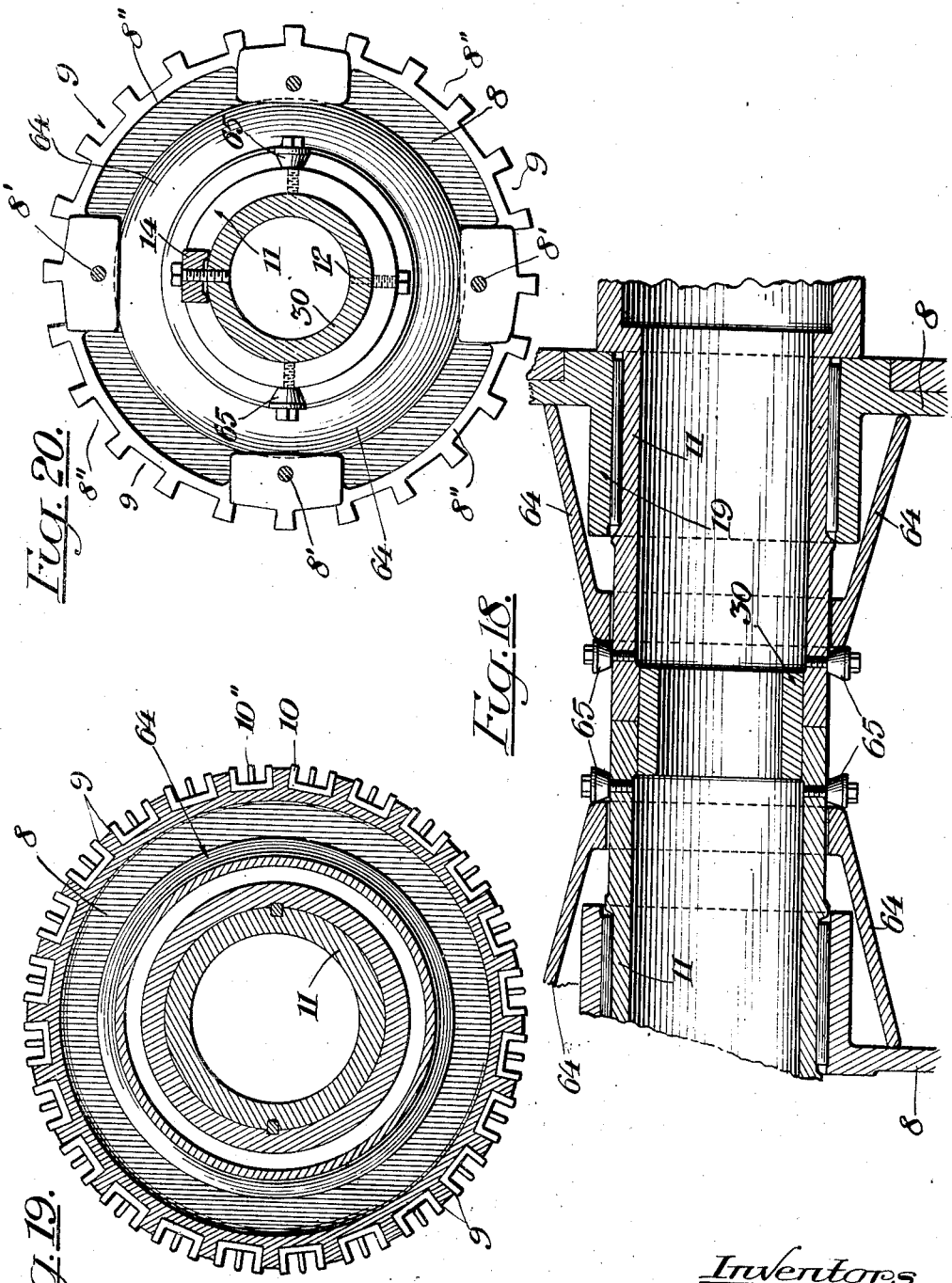

Feb. 16, 1926.
O. A. SMITH ET AL
NUT TAPPING MACHINE
Filed Jan. 17, 1922
1,573,099
15 Sheets-Sheet 14
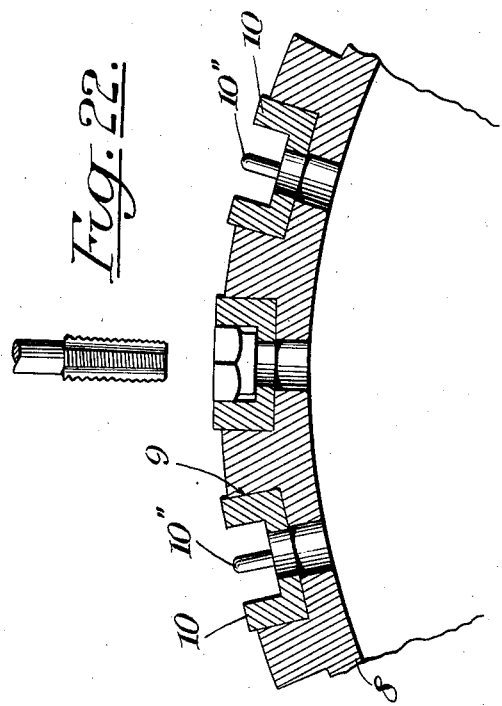
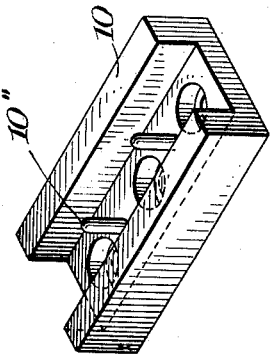
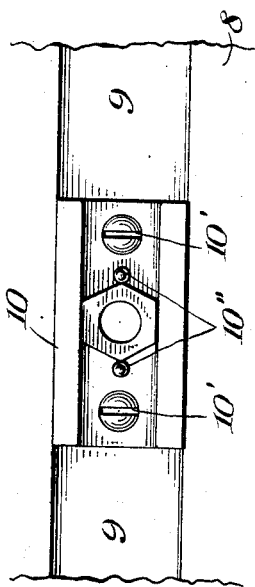
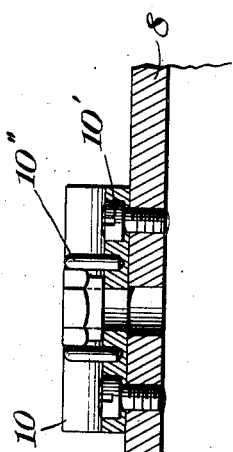

Feb. 16, 1926.
O. A. SMITH ET AL
1,573,099
NUT TAPPING MACHINE
Filed Jan. 17, 1922  15 Sheets-Sheet 15
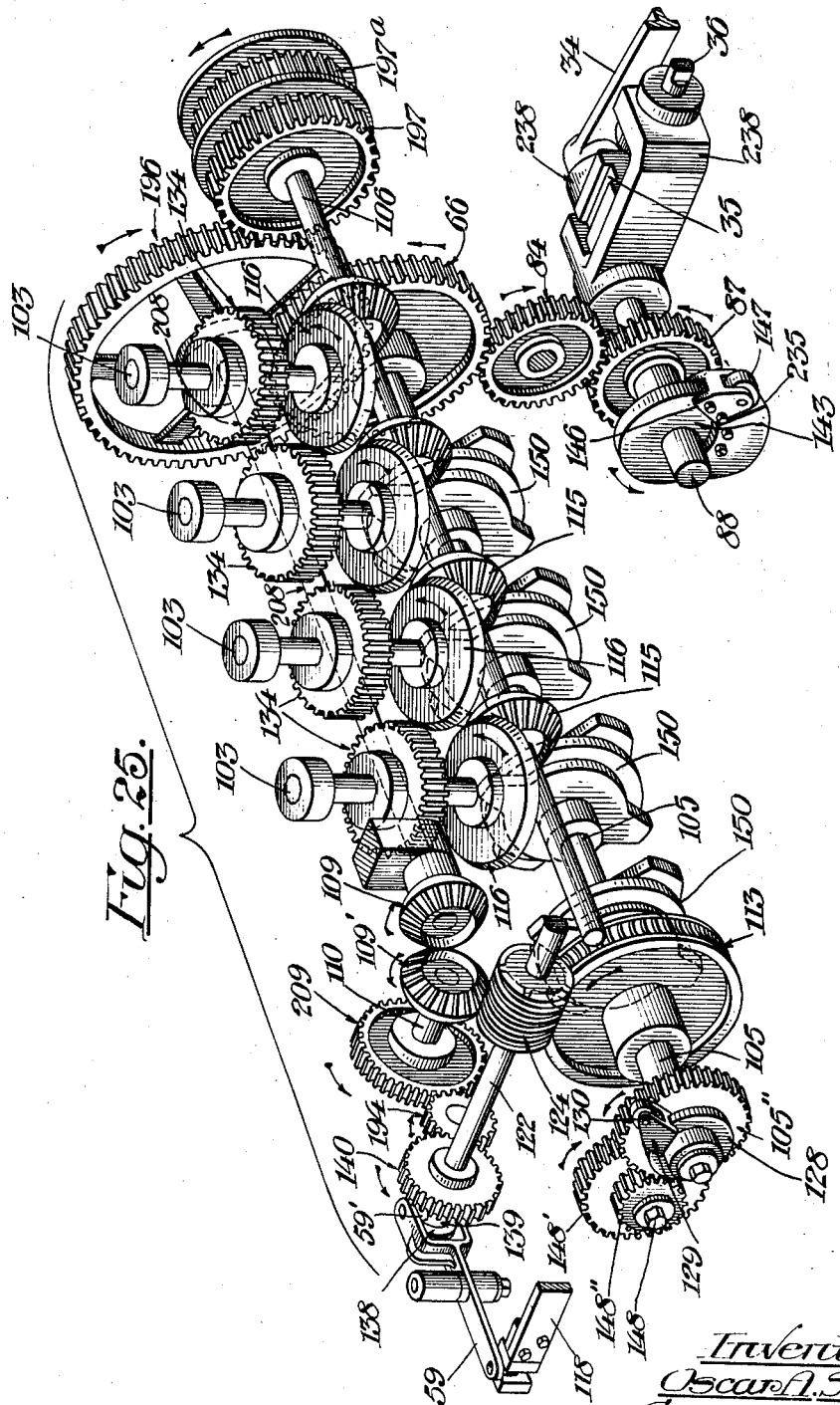
Inventors,
Oscar A. Smith
George J. Leber
by their Attorneys Patented Feb. 16, 1926.

1,573,099

UNITED STATES PATENT OFFICE.

OSCAR A. SMITH, OF EAST CLEVELAND, AND GEORGE J. LEBER, OF CLEVELAND, OHIO, ASSIGNORS TO THE NATIONAL ACME COMPANY, OF CLEVELAND, OHIO, A CORPORATION OF OHIO.

NUT-TAPPING MACHINE.

Application filed January 17, 1922. Serial No. 529,948.

*To all whom it may concern:*

Be it known that we, OSCAR A. SMITH and GEORGE J. LEBER, both citizens of the United States, said SMITH residing at East Cleveland and said LEBER at Cleveland, both in the county of Cuyahoga and State of Ohio, have invented certain new and useful Improvements in Nut-Tapping Machines, of which the following is a specification.

This invention relates to machines for tapping or threading nuts or nut blanks previously made from the bar or cold pressed. It is essential that the nut blanks be tapped true with the face or bottom of the nut and heretofore many difficulties frequently interfered with this true tapping of the nut blank because the blank holding means was stationary, so that chips frequently got underneath the blanks which the oil did not remove, and consequently the nut blank did not lie perfectly square in its hole, and therefore one of the greatest difficulties has been the collection of chips in the nut blank holding means, which however, has been eliminated in the present improved machine by the turret and blank holding means carried thereby.

The object of the present improvement is therefore the provision of an improved nut tapping or threading machine, by means of which the tapping of nuts is very materially facilitated and speedily accomplished while at the same time the nuts will be tapped true.

Another object of this invention is the provision of an improved indexible blank carrying turret, which can be readily maintained clean from chips, since it is self cleaning.

Another object of the invention is the provision of means for indexing and locking the nut blank turret.

Another object of the invention is the provision of improved rotatable and reciprocal tap spindle mechanism, in which the spindles are cushioned during the entrance of the taps into the nuts, and in which also means is provided to enable the spindles to effectively clear the nuts after they have been tapped, and which spindles are suitably counterbalanced, so that they will not drop down by gravity.

A further object of the invention is the provision of an improved machine of the class described, in which after each nut is tapped the turret will be automatically indexed, the reciprocation of the spindle and the indexing of the turret being automatically stopped after a predetermined number of nuts have been tapped thereby to permit the removal of such nuts.

A further object of the invention is the provision of an improved machine of the class described having a bank or series of rotatable and reciprocating tap carrying spindles cooperating with a single horizontally supported turret or drum adapted to carry a large number of nut blanks and wherein all of the spindles may operate simultaneously upon a corresponding number of nut blanks carried by the drum and also the provision of such an improved machine wherein the turret is automatically indexed and locked, and the spindles automatically reciprocated through the medium of cam shaft mechanism, and in which the cam shaft mechanism is automatically stopped at a predetermined time, and which machine is comparatively simple in construction and operation and speedy and accurate in the production of the work.

A still further object of the invention is the provision of an improved machine of the class specified, in which a bank of reciprocating and rotating nut tapping spindles cooperate with a rotatable blank carrying drum in combination with suitable mechanism for indexing and locking the drum, rotating and reciprocating the spindles, and for automatically stopping the rotation of the drum and the reciprocation of the spindles and all operative from a single motor or source of power carried by the machine, and in which also manually operative means is provided for stopping the rotation of the spindles, the reciprocation thereof and the starting of the cam shaft mechanism, and in which also the speed of the cam shaft mechanism can be readily changed in accordance with the work to be done.

Figure 2:
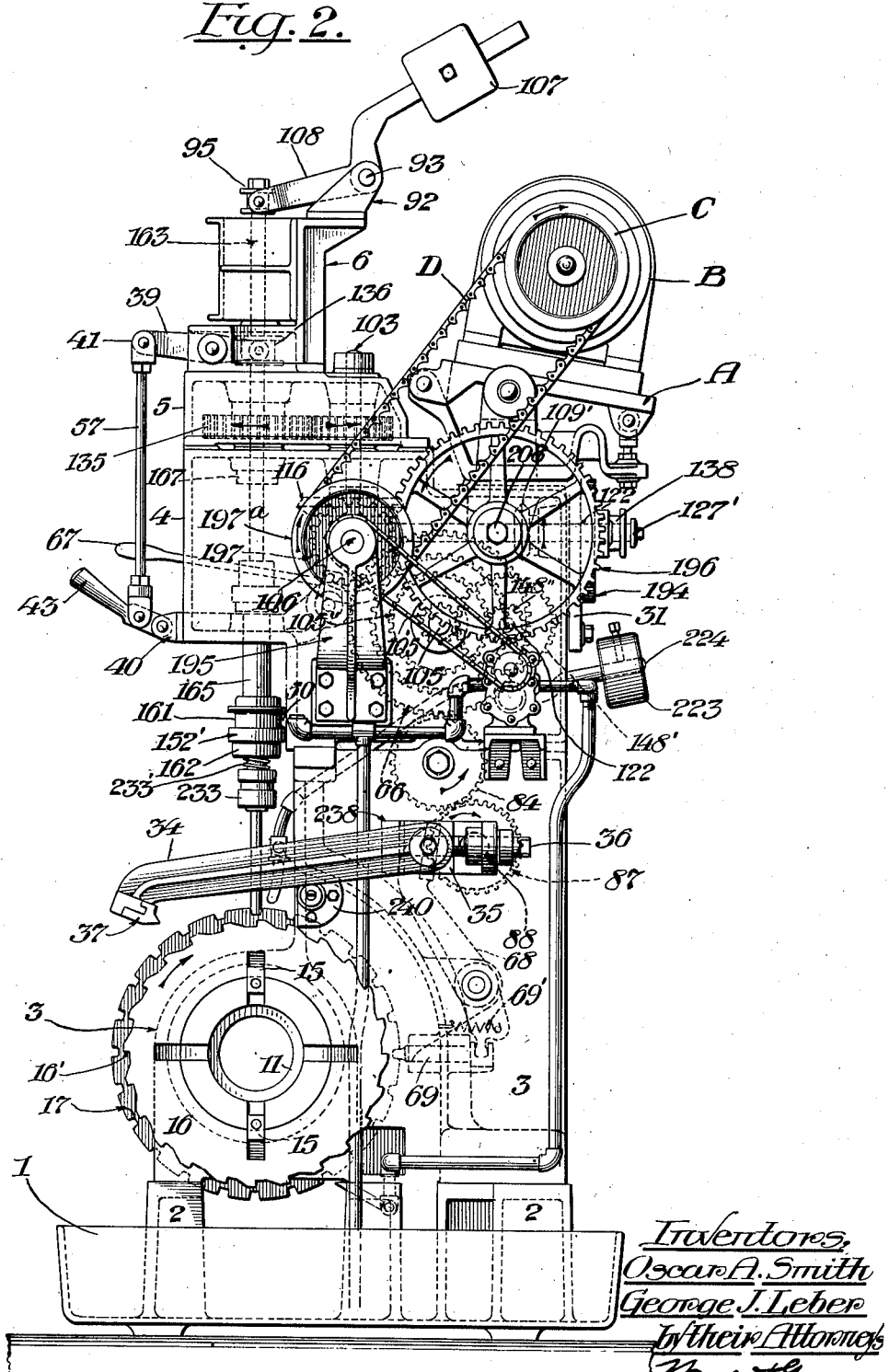
Figure 3:
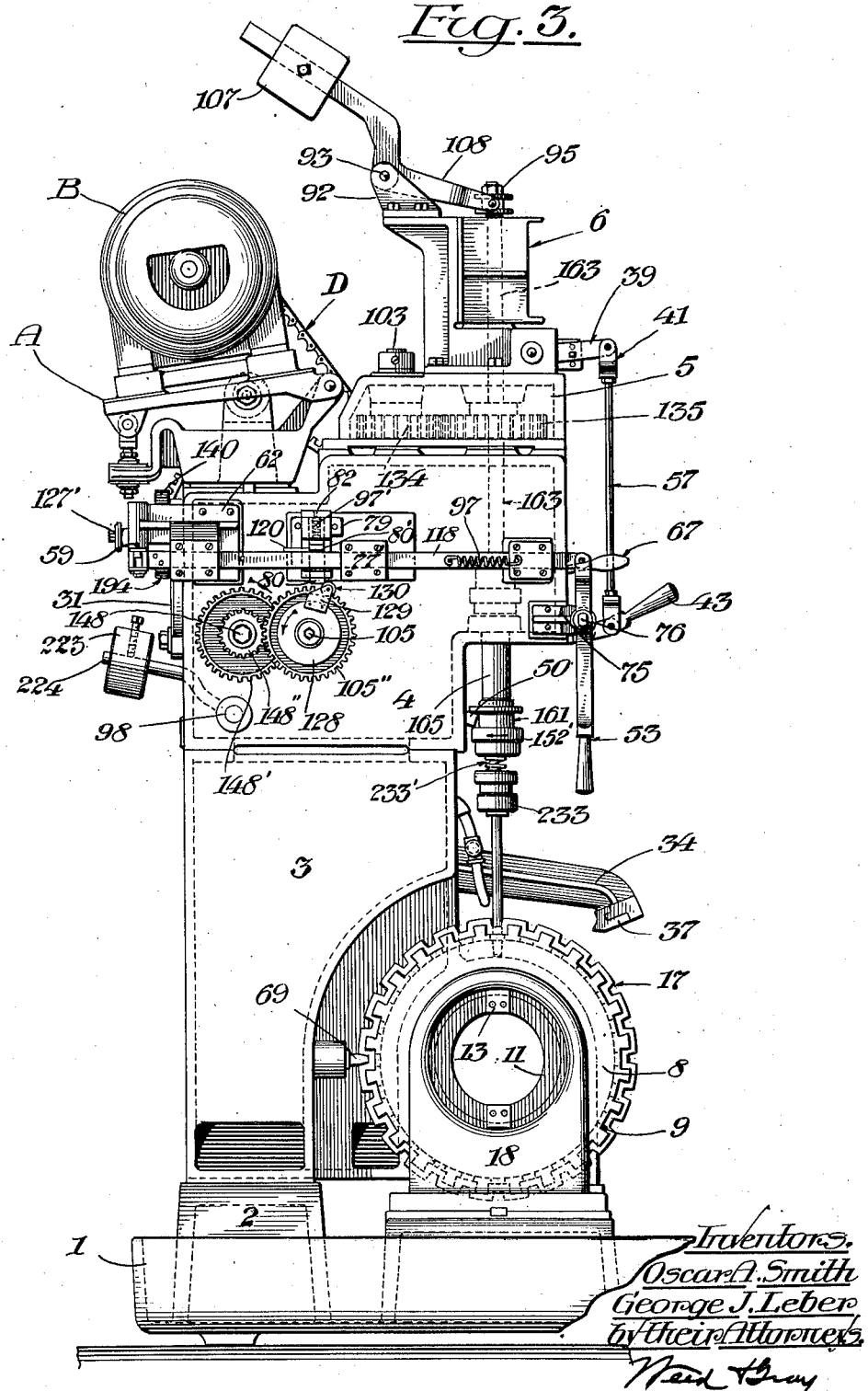
Figure 4:
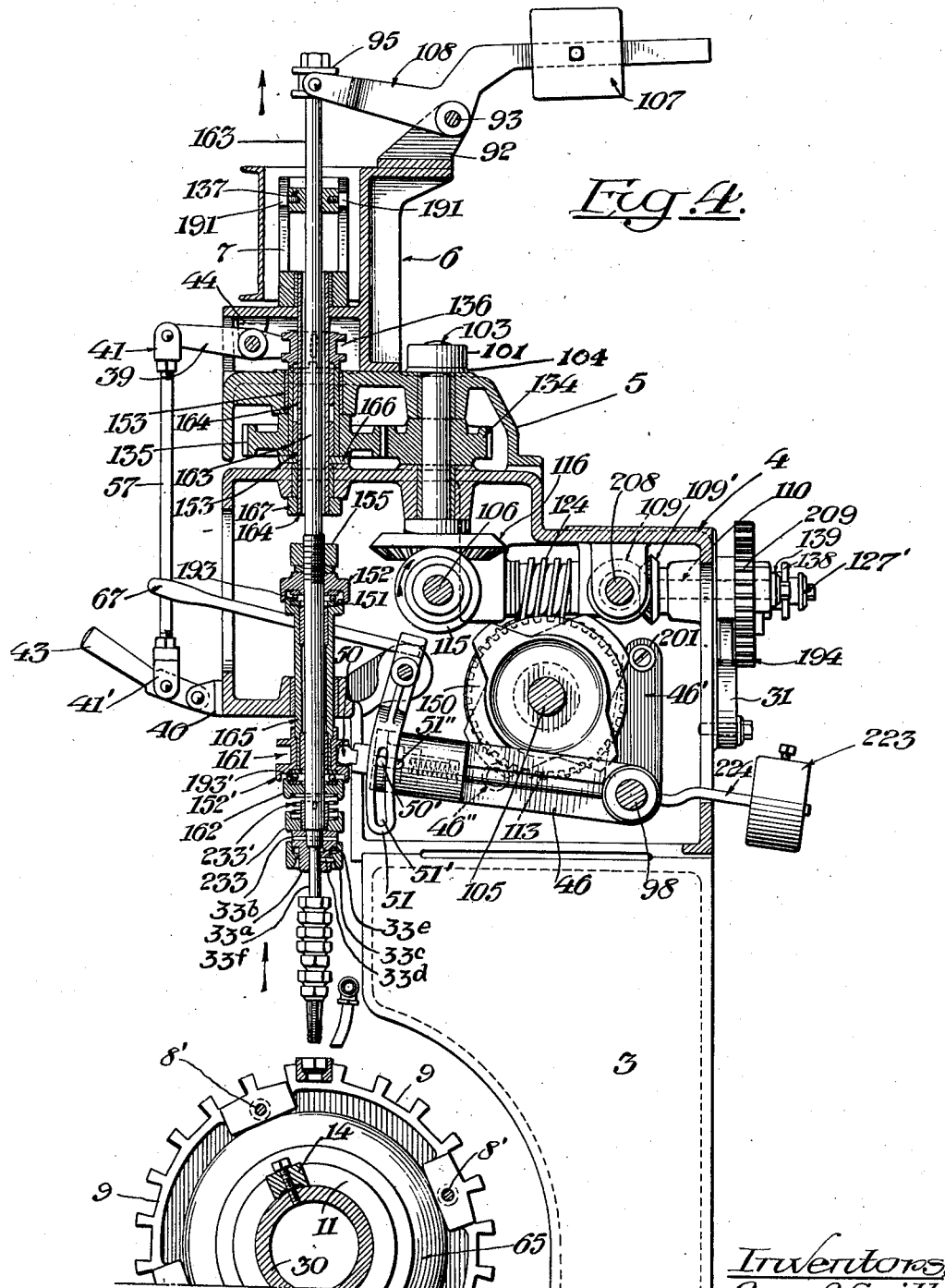
Figure 5:
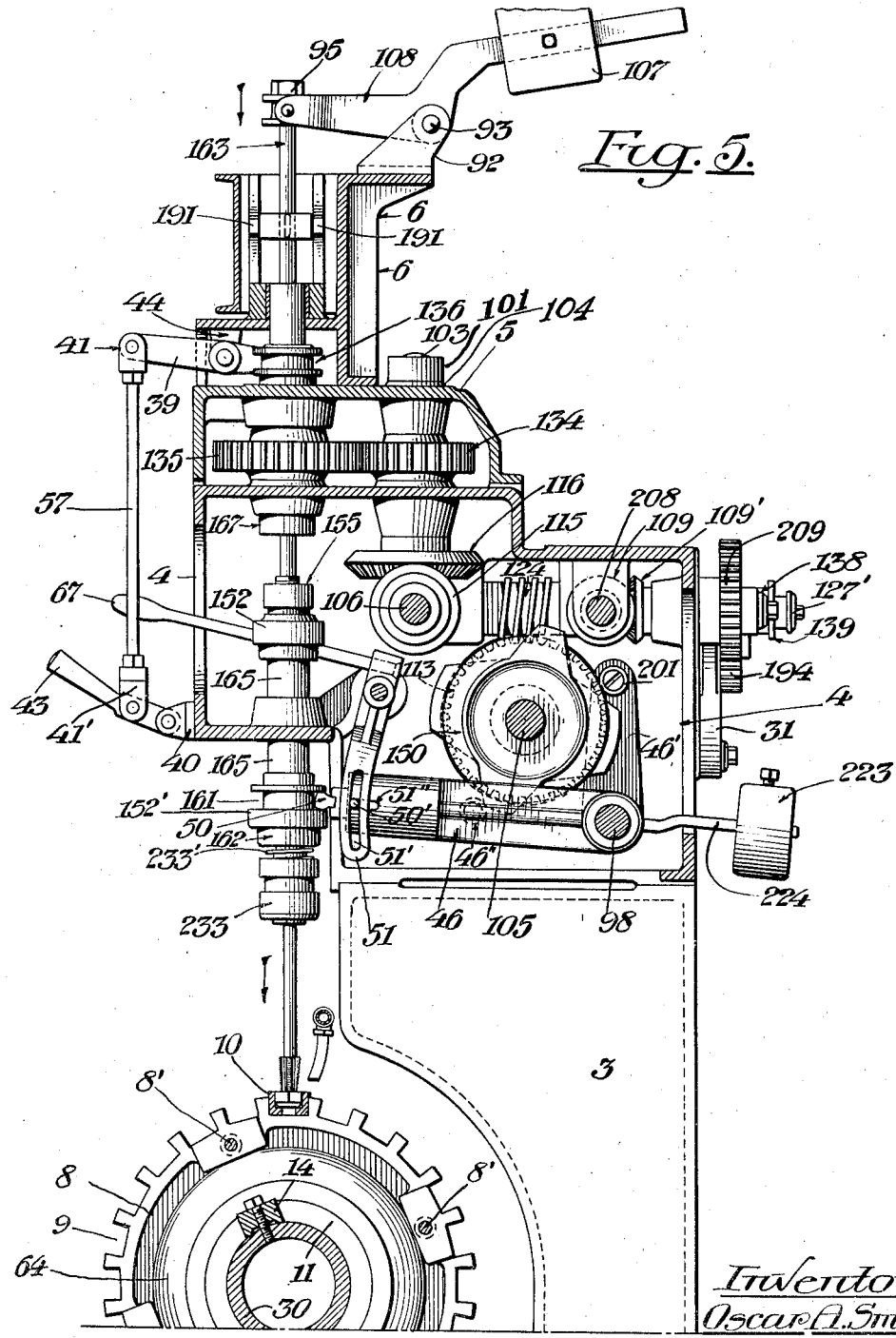
Figure 6:
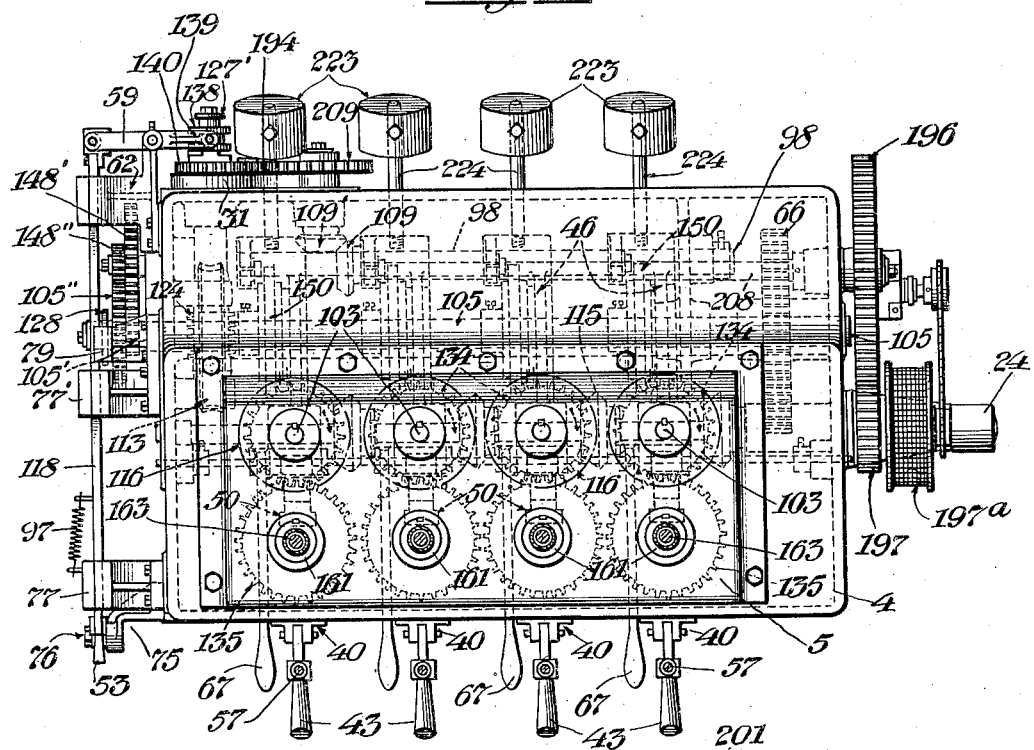
Figure 7:
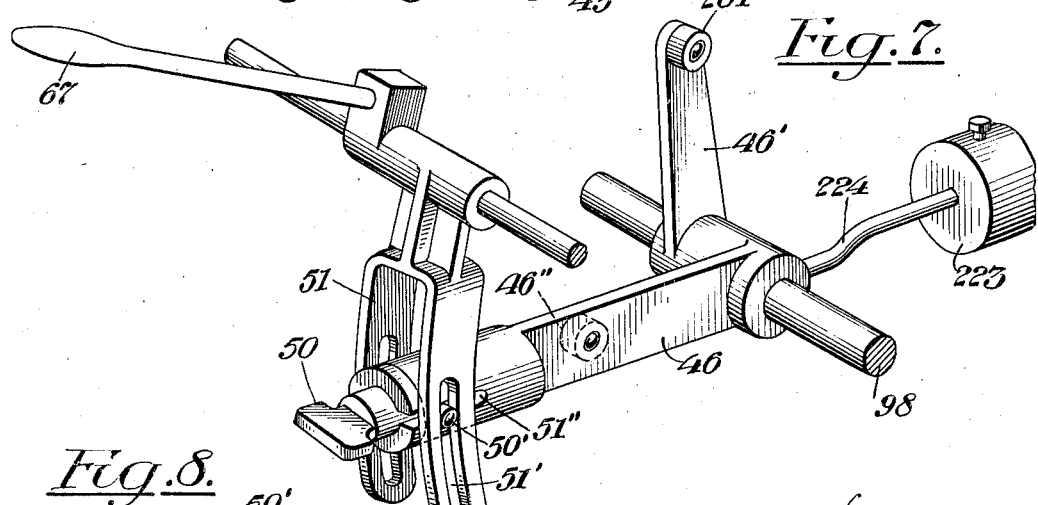
Figure 8:
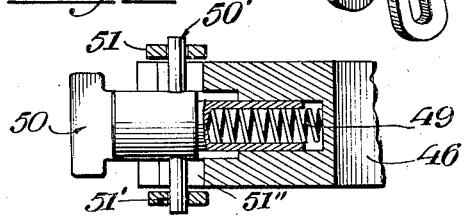

Various other important objects will appear throughout the specification and in the drawings accompanying and forming a part of this specification, and in which Fig. 1 is a front view of this improved machine; Fig. 2 is a right-hand side view thereof, this being the indexing side of the machine; Fig. 3 is a left-hand side view thereof, this being the side carrying the automatic mechanism for stopping the rotation of the cam shaft mechanism; Fig. 4 is a vertical transverse sectional view taken on line 4—4 Figure 1; Fig. 5 is a vertical transverse sectional view taken on line 5—5 Figure 1; Fig. 6 is a top plan view of the machine with the motor mechanism removed; Fig. 7 is a detail perspective view of the cam operated means for reciprocating the tapping spindles; Fig. 8 is a detail sectional view of the forward end of the lever shown in Figure 7; Fig. 9 is a horizontal sectional view of the machine taken on line 9—9 Figure 1; Fig. 10 is a detail view of the turret indexing mechanism; Fig. 11 is a top view thereof; Fig. 12 is a detail partly sectional view of the turret locking mechanism; Fig. 13 is a view of a part of the left-hand end of the machine shown in Figure 3 and illustrating the automatic tripping mechanism for stopping the cam shaft mechanism; Fig. 14 is a view of a part of the back of the machine looking toward the left-hand in Figure 13 and likewise illustrates a part of the automatic tripping mechanism; Fig. 15 is a vertical sectional view of the mechanism for rotating the spindles; Fig. 16 is a sectional view of the worm shaft mechanism for rotating the worm wheel of the cam shaft; Fig. 17 is a longitudinal sectional view of the rotatable turret mechanism; Fig. 18 is a sectional view of the turret shaft; Fig. 19 is a cross sectional view taken on line 19—19 Figure 17; Fig. 20 is a cross sectional view taken on line 20—20 Figure 17; Figs. 21, 22, 23 and 24 are detail views illustrating one form of means for holding the nut blanks in the turret, Fig. 22 illustrating a portion of the tap; and Fig. 25 is a perspective view of the gear assemblage for operating the turret indexing and locking mechanism, and for rotating the spindles and the cam shaft.

Similar characters of reference indicate corresponding parts in the several figures of the drawings.

This improved machine is adapted for all sizes of standard plain and castellated nuts, and is what may be designated as a column type machine, that is to say, the frame or framework for supporting the several mechanisms is built in sections one upon another to facilitate manufacture and assembly thereof.

In a general way this machine comprises the following mechanisms; the turret mechanism comprising a rotatable horizontally supported turret or drum, a locking mechanism therefor and an indexing mechanism therefor, spindle mechanism including means for rotating the spindles, a cam shaft mechanism and means operated thereby for automatically reciprocating the spindles, and also for operating the turret locking and indexing mechanism, and automatic trip controlling mechanism for automatically controlling the rotation of the cam shaft thereby to automatically stop the reciprocation of the spindles and the indexing of the turret.

*The framework.*

The supporting column or framework comprises sections 1, 2, 3, 4, 5 and 6, the lower section 1 being formed as a suitable chip and oil receiving pan, and it will be understood that a suitable oil pump and feed tubes are provided for supplying oil to the operating parts, which oil pump is operated from the spindle shaft 106 hereinafter described by means of a suitable sprocket chain (see Figs. 1 and 9).

*The rotary blank holding turret.*

The section 2 of the framework or column is mounted upon section 1 and in suitable bearings of this section 2 is mounted a tubular shaft 11 (see more particularly Figs. 17 and 18). This tubular shaft is made in two sections to facilitate the ready manufacture and assembling thereof, the inner mating ends of which are machined to receive connecting ring 30, which is fastened to the inner ends of the shaft 11 by dog point screws 12. Into the inner faces of these tubular shaft sections are milled suitable alined notches, in which is located a key block 14 (see Fig. 17) which is fastened to the connecting ring 30 by a suitable bolt 14'. The extended bearings of the column have suitable bronze flanged bushings 28 and 29 for this shaft. Mounted on the periphery of this shaft 11 by suitable key-ways and keys is a two-section turret 8, the inner opposing faces of which are provided with inwardly extended lugs for the reception of suitable bolts and nuts 8', thereby to bind the two sections of the turret together. This turret is likewise made in two sections to facilitate its manufacture and assemblage. The periphery of the turret is provided with four equally spaced bores or openings 8" to facilitate the assemblage of the sections. A pair of tapered fill rings 64 have the inner ends thereof bearing on the hollow shaft 11 and their outer ends forced against the ends of the hollow turret by means of tapered collars and screws 65 (see Fig. 18) and these tapered fill rings serve to carry the oil and chips out through the bores or openings 8" in the periphery of the turret. Thus, the turret in the present instance is in the form of a cylinder or drum fixed to and therefore rotatable with the horizontal hollow or cylindrical shaft 11. The bearing 18 (see Fig. 17) for one end of the shaft 11 is adjustable laterally upon the section 2 of the framework by means of a suitable tongue and tongue-way 18ª and suitable bolts. This end of the shaft 11 is held in position by a suitable clamping collar 13 fastened to the end of the shaft and by means of this clamping collar and a suitable shoulder on the periphery of the shaft 11 the lateral adjustment of the bearing 18 will hold the turret in a fixed position.

The periphery of the turret (see Figs. 17 to 24) is provided with a series of lengthwise extending grooves or recesses 9 of a predetermined number and equally spaced around the turret. Various forms of nut blank holders or chucks can be secured in these grooves according to the shape of the blank to be operated upon. In the present instance the turret is of a length to permit four nut blank holders to be carried in each groove or recess 9 and each of these four equally spaced nut blank holders or chucks is fastened to the turret by suitable screws.

In the present instance the nut blank holder comprises a U-shaped block 10 adapted to fit within a recess of the turret, these blocks being secured to the turret by suitable bolts or screws 10'. Centrally of the block it is provided with a bore corresponding to a bore in the periphery of the turret to permit the passage of the tap. Each block is provided with a pair of locating pins 10" for suitably locating the blank in position to be tapped. The nut is held against rotating during the tapping operation by the side walls of the U-shaped holders.

From the foregoing it will be observed that the rotary drum or turret is provided with a series of equally spaced recesses around the periphery thereof and in each of these recesses is located a series shown herein as four in number of nut blank receiving blocks or holders secured to the turret, so that at each indexing of the turret four blanks can be tapped at the same time while the chips will pass through the bores or openings in the bottom of the blank holders and the periphery of the drum to the interior thereof, and be conveyed by the tapered filler rings 64 to the openings 8" and therefore out of the drum or turret, thus maintaining the recesses and holders clean of chips. Moreover, by this construction the operator, during the tapping of a series of nuts, can if desired, readily clean the longitudinal extending recesses before inserting nut blanks into the holders in readiness to be tapped, since the holders are open at their ends as are likewise also the recesses at one end of the turret.

*Turret indexing and locking mechanisms.*

The turret is rotated or indexed step by step by suitable mechanism, and at each indexing thereof is locked in fixed position to permit, in the present instance, the tapping of four nut blanks at the same time. Secured to the periphery of an extended portion of the shaft 11 is an indexing disk 16 (see for instance Figs. 10 and 17), across the outer face of which is milled a pair of grooves and into these grooves is located a pair of key blocks 15, which are fastened to the end of the shaft 11 by suitable bolts, thus securing the indexing disk to the shaft 11.

The indexing disk 16 is in the form of a ratchet gear and is provided with a series of ratchet teeth 16' corresponding in number with the lengthwise extending grooves or recesses in the turret. Mounted in suitable bearings in the framework in parallel alinement with the turret and at a suitable distance to the rearward and above the same is located an indexing and locking auxiliary shaft 88 (see for instance Figs. 10, 12 and 25). Fastened to the outer end of this shaft 88 is an adjustable swivel head 238, in suitable spaced extended bearings of which a shaft 36 is mounted. This shaft 36 is provided with a suitable threaded portion to receive adjustable block 35, which is mounted between the extended bearings of the swivel head, and the swivel head 238 is provided with a slide-way between its extended bearings, in which the underside of the adjustable block 35 has a sliding bearing and to the outer face of this adjustable block is pivotally hung the indexing lever 34. Fastened to the column or framework a suitable distance away from the pivotal point of the indexing lever 34 is a cam roller bracket 240, and mounted on a stud of this bracket is a cam roller 241. Carried by the indexing lever 34 is a cam plate 239 in position to contact with the roller 241 at a predetermined time. This cam plate 239 and roller 241 co-operate at the proper time to hold the lever 34 away from the ratchet teeth 16' of the ratchet disk 16 and prevent the lever from dragging over the ratchet teeth when the end of the lever 34 is in its neutral position, while the adjustable swivel head is made adjustable so that the exact eccentric position can be obtained to correctly index the turret, so that the lock bolt will enter perfectly on every indexing of that turret. The end of the lever 34 is provided with a hardened plate 37 machined to conform to the contour of the ratchet teeth 16' on the periphery of the indexing disk 16. Fastened to the right-hand end of the turret (see Figs. 12 and 17) is a locking disk 17, the outer periphery of which is provided with suitable notches or stations corresponding in number with the number of grooves or recesses in the turret.

A lock bolt 69 (see Fig. 12) is housed in a suitable bore of the column at right angles to the turret shaft 11 and the outer end of this bolt is machined to mate with the notches or stations in the locking disk 17. At a suitable distance above this lock bolt 69 is pivotally hung a lock bolt lever 68, the lower end of which is machined to mate with a groove machined in the inner end of the lock bolt 69. The upper end of the lock bolt lever 69 is provided with a contact plate 71. Mounted on the auxiliary shaft 88, hereinbefore referred to, carrying the indexing lever 34, is a cam disk 143 made in two half sections and bolted together in a suitable manner. Adjustably mounted on the periphery and face of this cam disk is an indexing dog 146, the outer end of which is provided with a stud and roller 147, and directly in back of this dog is a holding out cam 235. A suitable spring 69' is secured to the lever 68, and to the framework, and by means of which the contact plate 71 is maintained in engagement with the cams of the cam disk 143. By this mechanism it will be observed that as the turret is indexed step by step by the indexing lever 34, the lock bolt will be forced into position to lock the turret, as each successive groove or recess thereof is brought under the taps and after the nuts have been properly tapped the lock bolt will be released from the locking disk 17 of the turret by the lever 68, and held away from the locking stations to permit proper indexing of the turret. Thus the auxiliary shaft 88 (see Figs. 10, 11, 12 and 25) during the rotation thereof operates the indexing lever 34, and the lock bolt mechanism in the manner just described.

*The worm and cam shaft mechanism.*

Housed in suitable bearings in section 4 of the column or framework and parallel with and at a suitable distance above the auxiliary shaft 88 is cam shaft 105, and in parallelism therewith and at a suitable distance above this cam shaft is auxiliary shaft 208 (see for instance Figs. 9 and 25). To the inner end of this auxiliary shaft 208 is suitably fastened a miter gear 109. At right angles to this auxiliary shaft 208 and housed in suitable bearings of the framework is mounted an auxiliary transverse shaft 110, to the end of which is fastened a miter gear 109' in mesh with miter gear 109. To the outer end of this transverse auxiliary shaft 110 and resting against the outer side of a collar 178 is fastened a suitable spur gear 209 (see Figs. 9 and 25). Spaced a suitable distance from this auxiliary shaft 110 and at right angles to the shaft 208 (see Figs. 9 and 25) is housed in suitable bearings worm shaft 122. To the inner end of the worm shaft 122 is fastened a positioning collar 127 and mounted loosely on a bushing of the worm shaft 122 is a spur gear 140. Mounted on a suitable hub portion of this spur gear 140 (see Fig. 14) and resting against the face of the framework is a quadrant 31, and mounted on a suitable stud of this quadrant is an intermediate gear 194, and this intermediate gear 194 is in mesh with the gear 209 on the transverse auxiliary shaft 110 and also with the gear 140 loosely mounted on the bushing of worm shaft 122. The gear 209 is interchangeable with either a smaller or a larger gear as the occasion for different speeds arises, and the quadrant 31 is adjustable to carry its gear 194 into position to mesh with the gears 140 and 209, this adjustment being obtained by means of a slot 31' in the quadrant and a suitable bolt.

The outer face of the gear 140 loosely mounted on the worm shaft 122, is provided with clutch teeth (see Fig. 16), and secured to the end of the worm shaft 122 in front of this gear 140 is a clutch sleeve 139, the periphery of which is provided with a pair of equally spaced keys, and mounted on the periphery of this clutch sleeve is a control clutch 138, the inner bore of which is provided with key-ways for the keys of the clutch sleeve 139, and this control clutch is provided with clutch teeth to mate with the clutch teeth on the face of the gear 140, so that by laterally shifting the clutch 138 a starting and stopping of the worm shaft is obtained in a manner which will be readily understood, that is to say, the gear 140 being loose upon the worm shaft, forms one member of the clutch while the other member thereof is formed by the clutch sleeve 139 fixed to the shaft and the sliding clutch member 138 keyed to the sleeve 139 and slidable toward and from the gear 140. The collar 127' on the outer end of the worm shaft 122 in connection with a suitable bolt properly positions the clutch sleeve. Mounted on the worm shaft 122 by means of a set screw (see Fig. 9) and between suitable bearings is a positioning collar 123 (Fig. 16) and keyed to the worm shaft 122 between suitable bearings is a worm 124. Mounted on the end of the cam shaft 105 and in mesh with this worm 124 is a worm wheel 113. Thus, by means of the worm shaft 122 and the gears 140, 194 and 209 and the bevel gears 109 and 109' the worm shaft is rotated from the auxiliary shaft 208, to which power is imparted in the manner hereinafter described.

At the opposite end of the cam shaft 105 and fixed thereto is a spur gear 66 (see Figs. 9 and 25) and at a suitable distance below this spur gear 66 and mounted on a suitable stud is an intermediate gear 84, which gear is in mesh with the gear 66 and also with a spur gear 87 mounted on the auxiliary shaft 88 (see Figs. 11 and 25) so that from the worm shaft the auxiliary shaft 88 is rotated to operate the indexing lever 34 and the lock bolt mechanism for the turret, hereinbefore described.

The cam shaft also carries the cam disks 150 for reciprocating the spindles in the manner hereinafter described, these being located a suitable distance apart according to the number of tap spindles used.

*Tap spindle reciprocating mechanism.*

At a suitable distance away from and below the cam shaft 105 and in parallel alinement therewith is mounted in suitable bearings a rock shaft 98 (see Figs. 4, 5, 7 and 9) and to this rock shaft 98 a series of spindle operating levers 46 (see Fig. 7) corresponding in number with the number of spindles are secured. In the present instance, four of these levers 46, one for each spindle, are shown, and each of these levers is operated by cam means 150 carried by the worm shaft, and therefore there are four of these cam means 150 located on the cam shaft suitably spaced from each other. The hub of each lever 46 is provided with an upwardly extended portion 46', to the upper end of which is fastened a stud and roller 201 in position to cooperate with the cam means 150 on the cam shaft 105. Into the outer end of lever 46 is housed a cushioned operating dog 50 (see Figs. 7 and 8), this dog being cushioned by means of a spring 49 located in a suitable bore of the enlarged end of the lever 46. A suitable stud and roller 46'' is carried by the lever 46 at a suitable distance from the end thereof, and this roller 46'' and roller 201 contact with the cam means 150 on cam shaft 105. To the rear end of the hub of lever 46 is fastened a suitable rod 224, on which is mounted a balance weight 223. To a suitable inwardly extended bearing of the framework is pivoted, by means of a rod, a forked lever 51, the lower forked ends of which are provided with elongated slots 51' and through the enlarged end of the lever 46 and extending from the end thereof inwardly is milled a suitable slot 51''. A pin 50' is carried by the dog 50, and extends through the slot in the end of the lever 46, and into the slots of the forked lever 51.

A hand lever 67 is fastened to the upper end of the forked lever 51, and projects to the front of the machine, and by operating this hand lever 67 the dog 50 can be entered into or released from the spindle operating spool 161 hereinafter described. In other words, the dog 50 can be retracted against the pressure of its spring 49 by pulling down the lever 67, and thus carry the dog away from the spindle spool 161, and by releasing the lever the spring will force the dog into the spool 161 (see for instance Figs. 4 and 5). Thus, each tap is reciprocated up and down by one of these lever mechanisms 46 and each is controlled by a handle 67.

*The tap spindles.*

A suitable distance above and in line with the center of the turret 8 are housed in section 4 of the framework reciprocating and rotatable spindles 163 equally spaced from each other. All of the spindles are identical so that a description of one will suffice for all. Into the lower part of section 4 (see particularly Figs. 4 and 5) is housed a quill or sleeve 165. In the upper and lower ends of this quill are housed half portions of thrust bearings 152 and 152'. The lower end of the spindle is freely fitted to revolve in the bore of this quill, and to the lower end of the spindle is attached a suitable tap holding chuck which will permit the tap to be quickly detached therefrom and replaced while the spindle is rotating. For this purpose the tool holder or tap holding chuck 33$^a$ (see Fig. 4) is pinned to the spindle as at 33$^b$, and on this chuck is located a shiftable or sliding sleeve 33$^c$, which acts to press a pin 33$^d$ into engagement with the shank of the tap while a pin 33$^e$ carried by the chuck prevents the rotation of the tap independently of its spindle. On the shifting of the sleeve 33$^c$ upwardly the pin 33$^d$ will be released from the tap 33$^f$ so that the tap can be readily and quickly removed by hand. Directly above this tap holding chuck is a collar 233 pinned to the spindle. Another collar 162 is loosely mounted on the spindle above the collar 233. The lower side of the collar 162 and the upper side of collar 233 are suitably recessed to house the ends of a spring 233' mounted on the collar 233, while the top side of the collar 162 is machined to receive the other half of thrust bearing 152'. The complete bearing with its balls is designated as 193'. On the lower end of the quill or sleeve 165 is fastened the spool 161, hereinbefore referred to, into which the dog 50 projects.

Loosely mounted on the spindle above the top of the quill 165 is a bearing collar 151, and into the underside of this collar is housed the other half of the bearing 152 and the complete bearing with its balls is designated as 193. Directly above this collar 151 and mounted on the spindle by means of screw threads is adjustable bumper collar 155. In columns 4, 5 and 6 of the framework in suitable bearings thereof is housed another quill or sleeve 164, and into the bore of this sleeve 164 is freely fitted the upper end of the spindle 163. To the upper end of this quill or sleeve 164 is fastened a driving sleeve 7 provided with a pair of suitable slots equally spaced and extending from the top toward the bottom a suitable distance. This sleeve also has a central bore of suitable diameter corresponding to the depth of the slots. A thrust collar 166 mounted on the quill or sleeve 164 rests on the upper face of the upper bearing of section 4 of the framework. A quill or sleeve 153 is bronzed bushed and mounted on the quill or sleeve 164, and the lower end thereof rests against the top side of thrust collar 166. This sleeve has an extended portion, which has a bearing in the bearing portion of section 5 of the column and extends through the same, this extended portion being provided with clutch teeth.

Between the lower face of section 5 of the column and resting against the top face of the collar 166 and fastened to the sleeve 153 is a spindle gear 135, and between the lower bearing in section 6 of the column and the upper bearing of section 5 and suitably fastened to the sleeve 164 is the spindle rotating connecting clutch 136, comprising the usual pair of clutch members, one rotatable relatively to the other.

Housed in the bore of the driving sleeve 7 and fastened to the spindle is spindle driving dog 137, and on the periphery of this dog and secured thereto by suitable screws and equally spaced from each other are a pair of rollers 191, which travel in the slots of the driving sleeve 7. To the upper end of the spindle 163 is suitably fastened a spool 95, and to the top of the top section 6 of the column is bolted a bracket 92. Pivoted at 93 to this bracket is a balancing weight lever 108. One end of this lever is crotched and is provided with a pair of rollers entering the grooved spool 95. To the opposite end of this lever 108 is mounted a balance weight 107, it being secured to the lever by a suitable set screw.

The weights 223 on the spindle reciprocating levers 46 and the weights 107 on the levers 108 at the top of the spindles act as a counterbalancing mechanism. In other words, they are so adjusted and set that the spindles remain in a neutral position, that is to say, when the cams on the cam disk 150 of the cam shaft 105 are not in connection with the rollers 201 of the lever 46, the spindles will not drop down due to their own weight. If these weights were not used, the spindles would drop when the turret was indexing.

The springs 233′ on the spindles between the collars 162 and 233 act as cushions. In other words, when the cams on the cam disk 150 of the cam shaft 105 engage the rollers 46″, the taps have entered the nuts and the springs are compressed. This forms a cushion start for the tap and saves the threads from mutilation (see for instance Fig. 5).

When however, the quill carrying the spindle has been raised by means of the cams of the cam disks 150 (see Fig. 4) coming in contact with the rollers 201, this brings the quill and its mechanism against the collar 155 and causes the tap to clear the nut blank a suitable distance, and so permit the turret to be indexed.

Manipulation of the hand lever 67 operates the crotched levers 51 in the manner hereinbefore described, and so forces the dogs 50 out of connection with the spools 151 of the spindles, thus stopping the reciprocation of the spindles. This is utilized should the tap break when part way through a nut blank, and it becomes necessary to raise any one of the spindles to remove the tap.

*The spindle rotating mechanism.*

Mounted in suitable bearings in the upper part of section 4 of the column or framework, and at a suitable distance from the spindles is a spindle driving shaft 106, (see Figs. 1, 4, 5, 9, 15 and 25) and keyed to the end of this shaft and resting against the outer face of section 4 of the column or framework is a spur gear 197 (see Figs. 6, 9, 15 and 25 for instance), and keyed to the spindle shaft 106 and resting against the outer face of gear 197 is a chain sprocket gear 197ª. A supporting bracket 195 (see Fig. 1) has one end thereof bolted to the side of section 4 of the column, while the upper end carries a bearing 24 (see Figs. 9 and 15), in which one end of the shaft 106 is housed. Secured to the shaft 106 at suitable spaced intervals are miter or bevel gears 115, four in number, one for each spindle.

Mounted in suitable bearings at right angles to the spindle shaft 106 and extending upwardly are four auxiliary spindle drive shafts 103, and to the lower end of each of these shafts is mounted a miter gear 116 in mesh with a miter gear 115. The upper end of each of these shafts 103 is housed in the top section 5 of the column. Secured to each shaft 103 between the bearings of sections 4 and 5 of the column is a spur gear 134 in mesh with the spur gear 135 mounted on the spindle sleeve 164, hereinbefore described. On the upper end of each shaft 103 and resting against the top of section 5 of the column is a thrust collar 101, and thrust washer 104.

From the foregoing it will be seen that on the rotation of the spindle driving shaft from a suitable source of power the tap spindles will be continuously rotated.

Suitable brackets 40 and 44 are secured to the framework and to each of the brackets 40 is pivoted one end of a hand controlled lever 43, and at a suitable distance away from the pivotal point of this lever is pivotally secured a crotch connecting link 41′ and pivotally hung in the slotted portion of the top bracket 44 is a clutch operating lever 39, the inner end of which is crotched or forked and carries a pair of stud rollers, which enter the groove of one member of the clutch 136 of its spindle. To the outer end of this lever 39 is pivoted a connecting link 41, and in the ends of these connecting links 41 and 41' is secured the ends of a connecting rod 57, so that by manipulating the levers 43, the clutches 136 of the spindles can be disconnected from the spindle drive thereby stopping the rotation of the spindles.

*The main driving mechanism.*

Mounted on the extreme top of the column is an adjustable motor platform A (see Fig. 2), on which is mounted a suitable motor B. The shaft of this motor is provided with a suitable sprocket gear C in line with the sprocket gear 197ª carried by the rotating spindle shaft 106, and these sprocket gears C and 197ª carry a suitable drive chain D, by means of which the spindle driving shaft 106 is rotated and thereby, through the short shafts 103 and spur gears 134 the spindles are rotated. At the same time as gear 197 carried by the spindle driving shaft 106 is in mesh with a spur gear 196 (see Figs. 9 and 25), which gear 196 is fixed to the shaft 208, hereinbefore referred to, carrying the miter gear 109, this rotates through change gears 209, 194 and 140, the worm shaft 122 and thereby the cam shaft 105, which, by means of the cams 150 thereon and the levers 46 hereinbefore described and dogs 50, raise and lower the taps, and at the same time the cam shaft, through the gears 66, 84 and 87 (see Fig. 25) rotates the auxiliary shaft 88, which thus indexes and locks the turret.

*Automatic trip controlling mechanism.*

In a T-formed slot on the outer face of the column or framework opposite to that where the turret indexing means is located and in horizontal alinement with the center of the cam shaft 105, is slidingly housed a stud 148 (see Figs. 3 and 6, but more particularly 13 and 14) and mounted on this stud 148 are a pair of spur gears 148' and 148" pinned to each other by suitable pins.

Fastened on the end of the cam shaft is a spur gear 105' in mesh with the spur gear 148'. The spur gear 148" carried by the stud 148 is in turn in mesh with a spur gear 105", which is loosely mounted on the cam shaft. A timing cam disk 128 is mounted on the cam shaft and is fastened to the outer spur gear 105", and on the periphery of this cam disk 128 is adjustably mounted a tripping cam 129 carrying at its upper end a stud roller 130. At a suitable distance above the cam shaft on the outer face of the column or framework are mounted in horizontal alinement with each other suitable spaced bearings 62, 77 and 77', which are provided with rectangular bores, in which is housed a tripping rod 118. Bearing 62 is provided with an outwardly extended vertical bore, in which is housed a bolt, to which is pivotally secured a tripping lever 59. One end of this lever is crotched and carries a pair of stud rollers 59', which project into the groove of the control clutch 138, located on the end of the worm shaft 122 hereinbefore described, and the outer end of this lever 59 is pivoted to the tripping rod 118 and it is by this means that the worm shaft 122 and cam shaft 105 are thrown into and out of operation. A suitable distance below the front bearing 77 an extended bracket 75 is bolted to the column. Pivoted to the end of the tripping rod 118, and to the bracket 75 is a hand controlled lever 53. A coiled spring 97 is secured at one end to the front bracket 77 and at its opposite end to the tripping rod 118.

Bolted to the bed of the machine at a suitable position between the rear bearing 62 and the middle bearing 77' is a tripping dog 79 having a slot at its lower end for slidably receiving the tripping rod 118. In a rectangular bore of the dog 79 is mounted a vertically sliding tripping bolt 80 having a lateral projection or lug 80ª resting upon the rod 118. A locking key 120 is secured to the tripping rod 118 and as shown in Fig. 13 abuts against the lug 80ª. Between the upper end of the tripping bolt 80 and the underside of a buffer plate 82 is located a compression spring 97'. When the machine is tapping nuts lug 80ª engages key 120 and holds the trip rod 118 in position against the tension of spring 97, the spring 97' holding the lug 80ª down against the top of the tripping rod and against the end of the key 120. Upon the rotation of the cam shaft and disk 128, the roller 130 carried by dog 129 contacts at the proper time with tripping bolt 80 thereby lifting the same and releasing the locking key 120 from the projection 80ª. Thereupon the spring 97 will draw the tripping rod 118 forward and disconnect the clutch mechanism on the worm shaft, stopping the rotation of the cam shaft and the indexing of the turret. By shifting the handle 53 the parts will be reset in the manner shown in Fig. 13 so that the clutch will re-engage and will be held in engagement. By suitable change gears 148', 148" and 105' and 105" the tripping mechanism is so timed as to allow the turret to be indexed a predetermined number of times, while at the same time the taps will be reciprocated a similar number of times, that is to say, by the use of suitable change gears the dogs 129 is so timed that the rotation of the cam shaft is only stopped after the turret has been indexed a predetermined number of times, in the present instance 10 times, so that the taps are operative upon the blanks before the cam shaft is stopped in its rotary movement. When this has occurred the operator, by shifting the lever 53 (Figs. 13 and 14) reconnects the clutch mechanism on the end of the worm shaft and ten more nuts for instance, are tapped.

*The operation of the machine.*

A tap of suitable length to allow for example, ten nuts to pass over the threaded portion and remain on the shank, is entered into each of the tap spindles and the tripping mechanism just described for the cam shaft is, by means of suitable change gears and the proper adjustment and timing of the dog 129, set to permit the tap spindles, by means of the cams on the cam disks 150 of the cam shaft 105, to be lowered and raised, in other words, to permit ten nut blanks to be tapped and the taps raised clear thereof. At this time the cam shaft will have made one cycle or one rotation, bringing the tripping dog 129 into position to engage the bolt 80 and release the trip rod 118 so as to disconnect the clutch on the end of the worm shaft, thereby stopping the rotation of the worm shaft and the cam shaft.

The operator may then stop the spindles from rotating by manipulating the levers 43, thereby disconnecting the clutches 136 of the spindles, which thus stops the rotation of the spindles, whereupon each tap can be removed from its spindles and the ten nuts just tapped removed from each tap. The taps, having been replaced in the spindles, the operator may then manipulate the levers 43, which operate the clutches 136, whereupon the spindles are again rotated. The operator, then, by operating the lever 53 (Fig. 13) reconnects the clutch 138 carried by the worm shaft, and this causes the worm shaft to rotate.

The spring 97' above the tripping bolt is stiff enough to hold the tripping bolt in operative position to permit the bolt to be automatically operated by the dog 129, the roller of which presses against it. This spring also allows the bolt to finally pass over the roller and return such bolt to its neutral or operating position after the roller has passed by, whereupon when the operator desires to start the machine he manipulates the lever 53 and shifts the trip rod 118 against the tension of spring 97 so as to reengage the clutch members on the worm shaft.

The operator loads the turret with the necessary number of blanks by placing the same in the holders before the holders reach their tapping positions, and he can load the holders of several recesses, since the turret is of sufficient size to permit several of these recess to be in such position that the blanks will not fall out. Furthermore, by this construction of the turret and manner of mounting the same, it will be observed that any chips or dirt which may be in the holders and recesses and not have passed to the interior of the drum, will fall out of the same as the drum passes downwardly away from the taps, thus automatically cleaning the holders so that the turret is what may be designated as a self-cleaning turret.

It will be understood of course that the cams are shown in a conventional way and that obviously the various details may be more or less modified without departing from the spirit or scope of the claims.

We claim as our invention:

1. In a metal working machine, the combination of a driving shaft, a rotary blank holding turret, a rotating tool carrying spindle, means connected to the shaft for rotating the spindle, mechanism driven by said shaft for indexing the turret, mechanism driven by said shaft for reciprocating the spindle, and automatic means for simultaneously disconnecting both of said mechanisms from said shaft.

2. In a metal working machine, the combination of a driving shaft, a rotary blank holding turret, a rotating tool carrying spindle, means connected to the shaft for rotating the spindle, mechanism driven by said shaft for indexing the turret, mechanism driven by said shaft for reciprocating the spindle, and means timed to automatically disconnect one of said mechanisms from the shaft after a predetermined number of operations thereof.

3. In a metal working machine, the combination of a rotary driving shaft, a shaft driven thereby, a rotary turret, a rotary tool carrying spindle, means connected to said driving shaft for rotating the spindle, mechanism controlled by said driven shaft for indexing the turret and reciprocating the spindle, and automatic means for disconnecting said driven shaft from said driving shaft.

4. In a metal working machine, the combination of a driving shaft, a rotary turret, a plurality of rotatable spindles, means controlled by said shaft for rotating the spindles, a cam shaft, means controlled by said cam shaft for reciprocating the spindles, and means controlled by said cam shaft and timed to automatically stop the reciprocation of the spindles after a predetermined number of reciprocations thereof.

5. In a metal working machine the combination of a driving shaft, a blank carrying turret, means for indexing the turret, a rotatable spindle, a cam shaft, means controlled by said cam shaft for shifting the spindle relatively to said turret, and means controlled by the cam shaft and timed to automatically stop said shiftable movement of the spindle after a predetermined cycle of operations thereof.

6. In a metal working machine, the combination of a horizontally supported rotary turret for holding the blanks, means for indexing it, means for locking it, a bank of rotating spindles each adapted to carry a tool, means for simultaneously rotating them, means for simultaneously reciprocating the spindles, and automatic means for simultaneously stopping the reciprocation of the spindles and the indexing of the turret after a predetermined number of reciprocations of the spindles and a similar number of step-by-step movements of the turret.

7. In a metal working machine, the combination of a cylindrically formed blank carrying turret having a plurality of blank holding means, and a common inclined chip discharging means within the cylindrical turret for all of said blank holding means.

8. In a metal working machine, the combination of a rotary blank holding turret having means for discharging the chips therefrom, means for operating the turret, tool carrying spindles, means for operating the spindles, and automatic means for simultaneously stopping the turret operating means and a part of the spindle operating means, said automatic means being timed to permit a predetermined number of operations of the turret and of the spindles.

9. In a metal working machine, the combination of a rotary blank holding turret having means for discharging the chips therefrom, means for indexing it, means for locking it, one or more rotatable spindles, each adapted to carry a tool, means for rotating each spindle, means for reciprocating each spindle, and automatic means for simultaneously stopping the reciprocation of the spindles and the indexing of the turret and timed to permit each spindle to be reciprocated and the turret to be indexed a predetermined number of times between each automatic stopping of the spindle and the turret.

10. In a metal working machine, the combination of a rotary turret having a series of spaced blank holder recesses extending lengthwise of the turret, means for indexing the turret, means for locking it, one or more rotatable spindles each adapted to carry a tool, means for rotating each spindle, means for reciprocating each spindle, and automatic means for simultaneously stopping the reciprocation of the spindles and the indexing of the turret without stopping the rotation of the spindles.

11. In a metal working machine, the combination of a drive shaft, a rotary turret having a series of spaced blank holder recesses extending lengthwise of the turret, means connected to said shaft for indexing and locking the turret, a spindle adapted to carry a tool, means controlled by the shaft for rotating the spindle, means for reciprocating the spindle, and automatic means for simultaneously stopping the reciprocation of the spindle and the indexing of the turret without stopping said shaft.

12. In a metal working machine, the combination of a horizontally supported rotary blank carrying turret, means for indexing it, means for locking it, cam shaft mechanism, a rotatable spindle adapted to carry a tool, means for rotating the spindle, means operated from the cam shaft mechanism for reciprocating the spindle, means also operated from the cam shaft mechanism for operating the turret indexing and locking means, and automatic means for simultaneously stopping the reciprocation of the spindle and the indexing of the turret.

13. In a metal working machine, the combination of a horizontally supported rotary blank carrying turret, means for indexing it, means for locking it, cam shaft mechanism, a rotatable spindle adapted to carry a tool, means for rotating the spindle, means operated from the cam shaft mechanism for reciprocating the spindle, means also operated from the cam shaft mechanism for operating the turret indexing and locking means, and automatic means for simultaneously stopping the reciprocation of the spindle and the indexing of the turret and likewise controlled by the cam shaft mechanism.

14. In a metal working machine, the combination of a horizontally supported rotary blank carrying turret, means for indexing it, means for locking it, cam shaft mechanism, a rotatable spindle adapted to carry a tool, means for rotating the spindle, means operated from the cam shaft mechanism for reciprocating the spindle, means also operated from the cam shaft mechanism for operating the turret indexing and locking means, and automatic means controlled by the cam shaft mechanism and timed for simultaneously stopping the reciprocation of the spindles and the indexing of the turret after a predetermined cycle of operations.

15. In a metal working machine, the combination of a rotary blank carrier, means for indexing it, cam shaft mechanism, a rotatable spindle adapted to carry a tool, means for rotating the spindle, means operated from the cam shaft mechanism for reciprocating the spindle, means also operated from the cam shaft mechanism for operating said indexing means, automatic means for stopping the reciprocation of the spindle after a predetermined cycle of operations and means for resetting said automatic means.

16. In a metal working machine, the combination of a drive shaft, a rotary blank carrier, means for indexing it, cam shaft mechanism, a rotatable spindle adapted to carry a tool, means for rotating the spindle, means for reciprocating the spindle toward and from the blank carrier, and means controlled by said cam shaft mechanism for automatically disconnecting said cam shaft mechanism from the drive shaft.

17. In a metal working machine, the combination of a rotary blank carrying turret, means for indexing it, cam shaft mechanism, a rotatable spindle adapted to carry a tool, means for rotating the spindle, means operated from the cam shaft mechanism for reciprocating the spindle, means also operated from the cam shaft mechanism for operating the turret indexing means, automatic means for simultaneously stopping the reciprocation of the spindle and the indexing of the turret, means for resetting said automatic means, and means for disconnecting the spindle from its reciprocating means.

18. In a metal working machine, the combination of a drive shaft, a cam shaft, a rotary blank carrying turret, means controlled by the cam shaft for indexing it, a rotatable tool carrying spindle, means connected to said drive shaft for rotating the spindle, means controlled by the cam shaft for reciprocating the spindle, means for automatically disconnecting the cam shaft from the drive shaft, means for disconnecting the spindle rotating means from the spindle, and means for disconnecting the spindle reciprocating means from the spindle.

19. In a metal working machine, the combination of a horizontally supported rotary blank carrying turret, means for indexing it, means for locking it, cam shaft mechanism, a rotatable spindle adapted to carry a tool, means for rotating the spindle, means operated from the cam shaft mechanism for reciprocating the spindle, means also operated from the cam shaft mechanism for operating the turret indexing and locking means, automatic means for simultaneously stopping the reciprocation of the spindle and the indexing of the turret, means for manually resetting said automatic means, means for disconnecting the spindle from their reciprocating means, and means for stopping the rotation of the spindle.

20. In a metal working machine, the combination of a horizontally supported rotary blank carrying turret, means for indexing it, means for locking it, cam shaft mechanism, a rotatable spindle adapted to carry a tool, means for rotating the spindle, means operated from the cam shaft mechanism for reciprocating the spindle, means also operated from the cam shaft mechanism for operating the turret indexing and locking means, automatic means for simultaneously stopping the reciprocation of the spindle and the indexing of the turret and likewise controlled by the cam shaft mechanism, means for manually resetting said automatic means, means for disconnecting the spindle from their reciprocating means, and means for stopping the rotation of the spindle.

21. In a metal working machine, the combination of a horizontally supported rotatable blank carrying turret having a series of spaced blank holder receiving recesses therein extending lengthwise of the turret, a bank of rotatable tool carrying spindles, cam shaft mechanism, means operated from said cam shaft mechanism for indexing the turret, means operated from said cam shaft mechanism for locking said turret, means operated from said cam shaft mechanism for reciprocating the spindles, and means for rotating the spindles.

22. In a metal working machine, the combination of a horizontally supported rotatable blank carrying turret having a series of spaced blank holder receiving recesses therein extending lengthwise of the turret, a bank of rotatable tool carrying spindles, cam shaft mechanism, means operated from said cam shaft mechanism for indexing the turret, means operated from said cam shaft mechanism for locking said turret, means operated from said cam shaft mechanism for reciprocating the spindles, means for rotating the spindles, and automatic means for stopping the rotation of the cam shaft independently of the rotation of the spindles.

23. In a metal working machine, the combination of a horizontally supported rotatable blank carrying turret having a series of spaced blank holder receiving recesses therein extending lengthwise of the turret, a bank of rotatable tool carrying spindles, cam shaft mechanism, means operated from said cam shaft mechanism for indexing the turret, means operated from said cam shaft mechanism for reciprocating the spindles, means for rotating the spindles, and automatic means controlled by the cam shaft mechanism for stopping the rotation of the cam shaft after the turret has been indexed and the spindles reciprocated a predetermined number of times.

24. In a metal working machine, the combination of a horizontally supported rotatable blank carrying turret having a series of spaced blank holder receiving recesses therein, a bank of rotatable tool carrying spindles, cam shaft mechanism, means operated from said cam shaft mechanism for indexing the turret, means operated from said cam shaft mechanism for locking said turret, means operated from said cam shaft mechanism for reciprocating the spindles, manually controlled means for disconnecting the spindles from their reciprocating means, means for rotating the spindles, and automatic means controlled by the cam shaft mechanism for stopping the rotation of the cam shaft after the turret has been indexed and the spindles reciprocated a predetermined number of times.

25. In a metal working machine, the combination of a horizontally supported rotatable blank carrying turret having a series of spaced blank holder receiving recesses therein, a bank of rotatable tool carrying spindles, cam shaft mechanism, means operated from said cam shaft mechanism for indexing the turret, means operated from said cam shaft mechanism for locking said turret, means operated from said cam shaft mechanism for reciprocating the spindles, means for rotating the spindles, manually controlled means for stopping the rotation of the spindles, and automatic means controlled by the cam shaft mechanism for stopping the rotation of the cam shaft after the turret has been indexed and the spindles reciprocated a predetermined number of times.

26. In a metal working machine, the combination of a horizontally supported rotatable blank carrying turret having a series of spaced blank holder receiving recesses therein, a bank of rotatable tool carrying spindles, cam shaft mechanism, means operated from said cam shaft mechanism for indexing the turret, means operated from said cam shaft mechanism for locking said turret, means operated from said cam shaft mechanism for reciprocating the spindles, means for rotating the spindles, automatic means controlled by the cam shaft mechanism for stopping the rotation of the cam shaft after the turret has been indexed and the spindles reciprocated a predetermined number of times, and manually controlled means for resetting said automatic means.

27. In a metal working machine, the combination of a horizontally supported rotatable blank carrying turret having a series of spaced blank holder receiving recesses therein, a bank of rotatable tool carrying spindles, cam shaft mechanism, means operated from said cam shaft mechanism for indexing the turret, means operated from said cam shaft mechanism for locking said turret, means operated from said cam shaft mechanism for reciprocating the spindles, manually controlled means for disconnecting the spindles from their reciprocating means, means for rotating the spindles, manually controlled means for stopping the rotation of the spindles, and automatic means for stopping the rotation of the cam shaft at predetermined times without stopping the rotation of the spindles.

28. In a metal working machine, the combination of a horizontally supported rotatable blank carrying turret having a series of spaced blank holder receiving recesses therein, a bank of rotatable tool carrying spindles, cam shaft mechanism, means operated from said cam shaft mechanism for indexing the turret, means operated from said cam shaft mechanism for locking said turret, means operated from said cam shaft mechanism for reciprocating the spindles, manually controlled means for disconnecting the spindles from their reciprocating means, means for rotating the spindles, automatic means for stopping the rotation of the cam shaft after the turret has been indexed and the spindles reciprocated a predetermined number of times, said automatic means being controlled by the cam shaft mechanism, and manually controled means for resetting said automatic means.

29. In a metal working machine, the combination of a horizontally supported rotatable blank carrying turret having a series of spaced blank holder receiving recesses therein extending lengthwise of the turret a bank of rotatable tool carrying spindles, cam shaft mechanism, means operated from said cam shaft mechanism for indexing the turret, means operated from said cam shaft mechanism for locking said turret, means operated from said cam shaft mechanism for reciprocating the spindles, means for rotating the spindles, manually controlled means for stopping the rotation of the spindles, automatic means for stopping the rotation of the cam shaft after the turret has been indexed and the spindles reciprocated a predetermined number of times, said automatic means being controlled by the cam shaft mechanism, and manually controlled means for resetting said automatic means.

30. In a metal working machine, the combination of a rotatable blank carrying turret supported on a horizontal axis and having a series of spaced blank holder receiving recesses therein extending lengthwise of the turret, a bank of rotatable tool carrying spindles, cam shaft mechanism, means operated from said cam shaft mechanism for indexing the turret, means operated from said cam shaft mechanism for locking said turret, means operated from said cam shaft mechanism for reciprocating the spindles, manually controlled means for disconnecting the spindles from their reciprocating means, means for rotating the spindles, manually controlled means for stopping the rotation of the spindles, automatic means for stopping the rotation of the cam shaft after the turret has been indexed and the spindles reciprocated a predetermined number of times, said automatic means being controlled by the cam shaft mechanism, and manually controlled means for resetting said automatic means.

31. In a metal working machine, the combination of a rotatable blank carrying turret having a series of spaced, blank holder recesses extending lengthwise of the turret, means for indexing said turret, means for locking it, cam shaft mechanism for operating said indexing and locking means, means for driving said cam shaft mechanism and means for automatically disconnecting said cam shaft mechanism from said driving means.

32. In a metal working machine, the combination of a turret supported for rotation on a horizontal axis and having a series of blank holders, means including ratchet mechanism for indexing said turret, means for locking said turret, cam shaft mechanism for controlling the operating of said ratchet mechanism and locking mechanism, a rotary shaft for driving said cam shaft mechanism and means for automatically stopping the indexing of the turret without stopping said rotary shaft.

33. In a metal working machine, the combination of a turret supported for rotation on a horizontal axis and having a series of blank holders, means including ratchet mechanism for indexing said turret, means for locking said turret, cam shaft mechanism for controlling the operation of said ratchet mechanism and locking mechanism, a rotary shaft for driving said cam shaft mechanism, means controlled by said cam shaft mechanism for automatically stopping the indexing of the turret without stopping said rotary shaft.

34. In a metal working machine the combination of a rotatable turret supported for rotation on a horizontal axis and having a series of spaced blank receiving means extending axially of the turret, a rotary shaft, means for rotating said shaft, means connected to said shaft for indexing the turret, and means for automatically disconnecting said last means.

35. In a metal working machine the combination of a rotatable turret supported for rotation on a horizontal axis and having a series of spaced blank receiving means extending axially of the turret, a rotary shaft, means for rotating said shaft, a plurality of reciprocating tools operated by said shaft, and means for automatically disconnecting the tools from said shaft.

36. In a metal working machine, the combination of a turret supported for rotation on a horizontal axis and having a series of spaced blank holder receiving recesses extending lengthwise of the turret, non-rotatable blank holding means carried in said recesses, a cam shaft, means for rotating the cam shaft, a ratchet gear connected to said turret, a ratchet arm operated from said cam shaft for indexing the turret, and means also controlled by said cam shaft for locking the turret and comprising a sliding locking bolt and a notched disk connected with said turret.

37. A rotary turret for a metal working machine having a series of spaced, recesses extending lengthwise of the turret and adapted to carry blank holders and also having a chip receiving opening therethrough.

38. A rotatable blank carrying turret comprising a hollow drum having a series of recesses opening into the interior of the drum, blank holding means carried in said recesses and chip discharging means carried interiorly of the drum.

39. A rotatable blank carrying turret comprising a shaft, a drum mounted thereon, said drum having a series of spaced blank holder receiving recesses extending lengthwise thereof and also having one or more chip receiving openings therethrough, and tapered filler rings extending from the ends of said drum toward the center of said shaft.

40. A rotatable blank carrying turret comprising a shaft, a hollow drum mounted thereon having a series of spaced blank holder receiving recesses, an opening in said drum, and a tapered filler ring located within said drum and inclined in the direction of said opening.

41. A rotatable blank carrying turret comprising a sectional shaft, means connecting the mating ends thereof, a sectional drum mounted thereon, means for connecting the mating ends thereof, said drum having a series of spaced, longitudinally extending blank holder receiving recesses.

42. A rotatable blank turret comprising a sectional shaft, means connecting the mating ends thereof, a sectional drum mounted thereon, means for connecting the mating ends thereof, said drum having a series of spaced, longitudinally extending blank holder receiving recesses and also having an opening therethrough.

43. A rotatable blank carrying turret comprising a sectional shaft, means connecting the mating ends thereof, a sectional drum mounted thereon, means for connecting the mating ends thereof, said drum having a series of spaced, longitudinally extending blank holder receiving recesses and also having an opening therethrough, and tapered filler rings surrounding said shaft and projecting toward the ends of said drum.

44. A rotatable blank carrying turret comprising a sectional shaft, means connecting the mating ends thereof, a sectional drum mounted thereon, means for connecting the mating ends thereof, said drum having a series of spaced, longitudinally extending blank holder receiving recesses and also having one or more openings therethrough, tapered filler rings surrounding said shaft and projecting toward the ends of said drum, a ratchet disk, and a locking disk connected with said shaft and drum, one connected to the shaft and the other to the drum.

45. In a metal working machine, the combination of a tool carrying spindle, a cam shaft, means operated from the cam shaft for reciprocating the spindle, means for rotating the spindle, and automatic trip controlling means for stopping the rotation of the cam shaft and thereby the reciprocation of the spindle.

46. In a metal working machine, the combination of a tool carrying spindle, a cam shaft, means operated from the cam shaft for reciprocating the spindle, means for rotating the spindle, and automatic trip controlling means for stopping the rotation of the cam shaft and thereby the reciprocation of the spindle and controlled by said cam shaft.

47. In a metal working machine, the combination of a tool carrying spindle, a cam shaft, means operated from the cam shaft for reciprocating the spindle, manually controlled means for disconnecting the spindle from its reciprocating means, and means for rotating the spindle.

48. In a metal working machine, the combination of a row of vertically reciprocating tool carrying spindles, rotatable blank holder mounted on a horizontal axis beneath the spindles, and means for indexing it, a cam shaft, means located below the cam shaft and actuated from said cam shaft for reciprocating said spindles, and means for rotating the spindles.

49. In a metal working machine, the combination of a tool carrying spindle, a cam shaft, means operated from the cam shaft for reciprocating the spindles, means for rotating the spindle, automatic trip controlling means for stopping the rotation of the cam shaft and thereby the reciprocation of the spindle, and means for manually resetting said automatic trip controlling means.

50. In a metal working machine, the combination of a tool carrying spindle, a cam shaft, means operated from the cam shaft for reciprocating the spindle, manually controlled means for disconnecting the spindle from its reciprocating means, means for rotating the spindle, automatic trip controlling means for stopping the rotation of the cam shaft and thereby the reciprocation of the spindle, and manually controlled means for stopping the rotation of the spindle.

51. In a metal working machine, the combination of a tool carrying spindle, a cam shaft, means operated from the cam shaft for reciprocating the spindle, manually controlled means for disconnecting the spindle from its reciprocating means, means for rotating the spindle, automatic trip controlling means for stopping the rotation of the cam shaft and thereby the reciprocation of the spindle, manually controlled means for stopping the rotation of the spindle, and manually controlled means for resetting the automatic trip controlling means.

52. In a metal working machine, the combination of blank holding means, a tool carrying spindle, a cam shaft, means operated thereby for reciprocating the spindle, means for rotating the spindle, a worm shaft for operating said cam shaft, a clutch connected therewith, and means controlled by said cam shaft for automatically operating said clutch thereby to stop the worm shaft and cam shaft and the reciprocation of the spindle.

53. In a metal working machine, the combination of blank holding means, a tool carrying spindle. a cam shaft, means operated thereby for reciprocating the spindle, means for rotating the spindle, a worm shaft for operating said cam shaft, a clutch connected therewith, means controlled by said cam shaft for automatically operating said clutch thereby to stop the worm shaft and cam shaft and the reciprocation of the spindle and comprising a reciprocating rod, locking means for said rod, and means carried by the cam shaft and operative to release said locking means.

54. In a metal working machine, the combination of blank holding means, a tool carrying spindle, a cam shaft, means operated thereby for reciprocating the spindle, means for rotating the spindle, a worm shaft for operating said cam shaft, a clutch connected therewith, means controlled by said cam shaft for automatically operating said clutch thereby to stop the worm shaft and cam shaft and the reciprocation of the spindle and comprising a reciprocating rod, a locking dog coacting with said rod, and means carried by the cam shaft and operative to release said dog.

55. In a metal working machine, the combination of blank holding means, a tool carrying spindle, a cam shaft, means operated thereby for reciprocating the spindle, means for rotating the spindle, a worm shaft for operating said cam shaft, a clutch connected therewith, means controlled by said cam shaft for automatically operating said clutch thereby to stop the worm shaft and cam shaft and the reciprocation of the spindle, said means comprising a reciprocating rod, locking means coacting with said rod, means carried by the cam shaft and operative to release said locking means, and a spring for shifting said rod, and means for shifting the rod in the opposite direction.

56. In a metal working machine, the combination of blank holding means, a carrying spindle, a cam shaft, means operated thereby for reciprocating the spindle, means for rotating the spindle, a worm shaft for operating said cam shaft, a clutch connected therewith, and means controlled by said cam shaft for automatically operating said clutch thereby to stop the worm shaft and cam shaft and the reciprocation of the spindle, said cam shaft controlled means being constructed and timed to disconnect the clutch only after a predetermined number of reciprocations of the spindle.

57. In a metal working machine, the combination of blank holding means, a tool carrying spindle, a cam shaft, means operated thereby for reciprocating the spindle, means for rotating the spindle, a worm shaft for operating said cam shaft, a clutch connected therewith, and means controlled by said cam shaft for automatically operating said clutch thereby to stop the worm shaft and cam shaft and the reciprocation of the spindle, said cam shaft controlled means being constructed and timed to disconnect the clutch only after a predetermined number of reciprocations of the spindle and including a system of change gears.

58. In a metal working machine, the combination of blank holding means, a tool carrying spindle, a cam shaft, means operated thereby for reciprocating the spindle, means for rotating the spindle, a worm shaft for operating said cam shaft, a clutch connected therewith, and means controlled by said cam shaft for automatically operating said clutch thereby to stop the worm shaft and cam shaft and the reciprocation of the spindle, said cam shaft controlled means being constructed and timed to disconnect the clutch only after a predetermined number of reciprocations of the spindle and including a system of change gears changeable to permit the disconnection of the clutch at different times thereby to vary the number of reciprocations of the spindle.

59. In a metal working machine, the combination of blank holding means, a tool carrying spindle, a cam shaft, means operated thereby for reciprocating the spindle, means for rotating the spindle, a worm shaft for operating said cam shaft, a clutch connected therewith, and means controlled by said cam shaft for automatically operating said clutch thereby to stop the worm shaft and cam shaft and the reciprocation of the spindle, said cam shaft controlled means being constructed and timed to disconnect the clutch only after a predetermined number of reciprocations of the spindle and including a system of change gears changeable to permit the disconnection of the clutch at different times thereby to vary the number of reciprocations of the spindle, and means for manually resetting the clutch.

60. In a metal working machine, the combination of a blank holding means, a rotatable spindle, means for rotating the spindle, a cam shaft, means controlled by the cam shaft for reciprocating said spindle, and means for disconnecting said reciprocating means from the spindle.

61. In a metal working machine, the combination of a blank holding means, a rotatable spindle, means for rotating the spindle, a cam shaft, means controlled by the cam shaft for reciprocating said spindle, and means for disconnecting said reciprocating means from the spindle and including a manually operative lever.

62. In a metal working machine, the combination of a blank holding means, a rotatable spindle, means for rotating the spindle, a cam shaft, means controlled by the cam shaft for reciprocating said spindle, means for disconnecting said reciprocating means from the spindle and including a manually operative lever and a cushioned dog.

63. In a metal working machine, the combination of a blank holder, a rotatable spindle, a cam shaft, a rock shaft, a rocking lever carried by said rock shaft and operated from said cam shaft, and a cushioned dog carried by said rocking lever and cooperating with the spindle for reciprocating the spindle.

64. In a metal working machine, the combination of a blank holder, a rotatable spindle, a cam shaft, a rock shaft, a rocking lever carried by said rock shaft and operated from said cam shaft, a cushioned dog carried by said rocking lever and cooperating with the spindle for reciprocating the spindle, and means including a lever for retracting the dog from the spindle.

65. In a metal working machine, the combination of a rotary horizontally supported blank holding turret, a cam shaft, means operated thereby for indexing the turret, means operated from the cam shaft for locking the turret, a bank of rotatable spindles, means for rotating them, a rock shaft, a series of rocking levers carried by said shaft one for each spindle and all operated simultaneously from the cam shaft, and a cushioned dog carried by each of said levers, each cooperating with a spindle to reciprocate it, whereby all of the spindles are reciprocated simultaneously from the cam shaft.

66. In a metal working machine, the combination of a rotary horizontally supported blank holding turret, a cam shaft, means operated thereby for indexing the turret, means operated from the cam shaft for locking the turret, a bank of rotatable spindles, means for rotating them, a rock shaft, a series of rocking levers carried by said shaft one for each spindle and all operated simultaneously from the cam shaft, a cushioned dog carried by each of said levers, each cooperating with a spindle to reciprocate it, whereby all of the spindles are reciprocated simultaneously from the cam shaft, and means for disconnecting each of said levers from its spindle.

67. In a metal working machine, the combination of a rotary horizontally supported blank holding turret, a cam shaft, means operated thereby for indexing the turret, means operated from the cam shaft for locking the turret, a bank of rotatable spindles, means for rotating them, a rock shaft, a series of rocking levers carried by said shaft one for each spindle and all operated simultaneously from the cam shaft, a cushioned dog carried by each of said levers, each cooperating with a spindle to reciprocate it, whereby all of the spindles are reciprocated simultaneously from the cam shaft, means for disconnecting each of said levers from its spindle, and means controlled by the cam shaft for automatically stopping the reciprocation of the spindles.

68. In a metal working machine, the combination of a rotary horizontally supported blank holding turret, a cam shaft, means operated thereby for indexing the turret, means operated from the cam shaft for locking the turret, a bank of rotatable spindles, means for rotating them, a rock shaft, a series of rocking levers carried by said shaft one for each spindle and all operated simultaneously from the cam shaft, a cushioned dog carried by each of said levers, each cooperating with a spindle to reciprocate it, whereby all of the spindles are reciprocated simultaneously from the cam shaft, means for disconnecting each of said levers from its spindle, means controlled by the cam shaft for automatically stopping the reciprocation of the spindles, and means for stopping the rotation of the spindles.

69. In a metal working machine, the combination of a rotary horizontally supported blank holding turret, a cam shaft, means operated thereby for indexing the turret, means operated from the cam shaft for locking the turret, a bank of rotatable spindles, means for rotating them, a rock shaft, a series of rocking levers carried by said shaft one for each spindle and all operated simultaneously from the cam shaft, a cushioned dog carried by each of said levers, each cooperating with a spindle to reciprocate it, whereby all of the spindles are reciprocated simultaneously from the cam shaft, means for disconnecting each of said levers from its spindle, means controlled by the cam shaft for automatically stopping the reciprocation of the spindles, and means for stopping the rotating of the spindles, said last means comprising manually controlled means one for each spindle.

70. In a metal working machine, the combination of blank holding means, a bank of rotatable spindles, a shaft, a series of upright shafts corresponding with the number of spindles and geared to said first shaft and with the spindles, means for rotating said first shaft, and means for stopping at will the rotation of any one of the spindles.

71. In a metal working machine, the combination of blank holding means, a bank of rotatable spindles, a shaft, a series of upright shafts corresponding with the number of spindles and geared to said first shaft and with the spindles, means for rotating said first shaft, means for stopping at will the rotation of any one of the spindles, a cam shaft, means for rotating it, and means operated thereby for reciprocating the spindles.

72. In a metal working machine, the combination of blank holding means, a bank of rotatable spindles, a shaft, a series of upright shafts corresponding with the number of spindles and geared to said first shaft and with the spindles, means for rotating said first shaft, means for stopping at will the rotation of any one of the spindles, a cam shaft, means for rotating it, means operated thereby for reciprocating the spindles, and means for stopping the reciprocation of any one of the spindles at will.

73. In a metal working machine, the combination of blank holding means, a bank of rotatable spindles, a shaft, a series of upright shafts corresponding with the number of spindles and geared to said first shaft and with the spindles, means for rotating said first shaft, means for stopping at will the rotation of any one of the spindles, a cam shaft, means for rotating it, means operated thereby for reciprocating the spindles, means for stopping the reciprocation of any one of the spindles at will, and means for automatically stopping the reciprocation of the spindles.

74. In a metal working machine, the combination of blank holding means, a bank of rotatable spindles, a shaft, a series of upright shafts corresponding with the number of spindles and geared to said first shaft and with the spindles, means for rotating said first shaft, means for stopping at will the rotation of any one of the spindles, a cam shaft, means for rotating it, means operated thereby for reciprocating the spindles, means for stopping the reciprocation of any one of the spindles at will, and means for automatically stopping the reciprocation of the spindles and controlled by said cam shaft.

75. In a metal working machine, the combination of blank holding means, a bank of rotatable spindles, a shaft, a series of upright shafts corresponding with the number of spindles and geared to said first shaft and with the spindles, means for rotating said first shaft, means for stopping at will the rotation of any one of the spindles, a cam shaft, means for rotating it, means operated thereby for reciprocating the spindles, means for stopping the reciprocation of any one of the spindles at will, and means for automatically stopping the reciprocation of the spindles and controlled by said cam shaft, said automatic means being constructed and timed to stop the reciprocation of the spindles only after a predetermined number of reciprocations thereof.

76. In a metal working machine, the combination of a horizontally supported rotatable blank carrying turret, a cam shaft, means operated therefrom for indexing the turret, means operated therefrom for locking the turret, a bank of rotatable counterbalanced spindles, and means operated from the cam shaft for reciprocating said spindles.

77. In a metal working machine, the combination of a horizontally supported rotatable blank carrying turret, a cam shaft, means operated therefrom for indexing the turret, means operated therefrom for locking the turret, a bank of rotatable cushioned spindles, and means operated from the cam shaft for reciprocating said spindles.

78. In a metal working machine, the combination of a horizontally supported rotatable blank carrying turret, a cam shaft, means operated therefrom for indexing the turret, means operated therefrom for locking the turret, a bank of rotatable counterbalanced and cushioned spindles, and means operated from the cam shaft for reciprocating said spindles.

79. In a metal working machine, the combination of a horizontally supported rotatable blank carrying turret, a cam shaft, means operated therefrom for indexing the turret, means operated therefrom for locking the turret, a bank of rotatable counterbalanced and cushioned spindles, means operated from the cam shaft for reciprocating said spindles, and means controlled by the cam shaft for automatically stopping the rotation thereof and the reciprocation of the spindles.

80. In a metal working machine, the combination of a horizontally supported rotatable blank carrying turret, a cam shaft, means operated therefrom for indexing the turret, means operated therefrom for locking the turret, a bank of rotatable counterbalanced and cushioned spindles, means operated from the cam shaft for reciprocating said spindles, and means controlled by the cam shaft for automatically stopping the rotation thereof and the reciprocation of the spindles and constructed and timed to stop the rotation of the cam shaft and the reciprocation of the spindles only once during each complete rotation of the cam shaft.

81. The combination of a blank carrier, a cam shaft, a reciprocating tool carrying spindle, means for rotating the spindle, means operated by the cam shaft for shifting the spindle endwise relatively to the carrier, and means for stopping the reciprocation and the rotation of the spindle, one independently of the other.

82. In a metal working machine, the combination of a rotatable tool carrying spindle, counterbalancing means connected therewith, a cam shaft, and counterbalanced means operated by said cam shaft for reciprocating said spindle.

83. In a metal working machine, the combination of a rotatable tool carrying spindle, counterbalancing means connected therewith, a cam shaft, counterbalanced means operated by said cam shaft for reciprocating said spindle, and automatic means controlled by the cam shaft for stopping the rotation of the cam shaft and thereby the reciprocation of the spindle.

84. In a metal working machine, the combination of a rotatable tool carrying spindle, counterbalancing means connected therewith, a cam shaft, counterbalanced means operated by said cam shaft for reciprocating said spindle, automatic means controlled by the cam shaft for stopping the rotation of the cam shaft and thereby the reciprocation of the spindle, and manually controlled means for disconnecting the counterbalanced reciprocating means from the spindle.

85. In a metal working machine, the combination of a rotatable tool carrying cushioned spindle, counterbalancing means connected therewith, a cam shaft, and counterbalanced means operated by said cam shaft for reciprocating said spindle.

86. In a metal working machine, the combination of a bank of rotatable tool carrying spindles, counterbalancing means connected with each of said spindles, means for rotating the spindles, a cam shaft, means for rotating the cam shaft, a rock shaft, and a series of counterbalanced levers carried by said rock shaft and connected with said spindles for reciprocating them from the cam shaft.

87. In a metal working machine, the combination of a bank of rotatable tool carrying spindles, counterbalancing means connected with each of said spindles, means for rotating the spindles, a cam shaft, means for rotating the cam shaft, a rock shaft, a series of counterbalanced levers carried by said rock shaft and connected with said spindles for reciprocating them from the cam shaft, and automatic means controlled by the cam shaft for stopping the rotation thereof and the reciprocation of said spindles.

88. In a metal working machine, the combination of a bank of rotatable tool carrying spindles, counterbalancing means connected with each of said spindles, means for rotating the spindles, a cam shaft, means for rotating the cam shaft, a rock shaft, a series of counterbalanced levers carried by said rock shaft and connected with said spindles for reciprocating them from the cam shaft, automatic means controlled by the cam shaft for stopping the rotation thereof and the reciprocation of said spindles, and manually controlled means for disconnecting the spindles from their reciprocating means.

89. In a metal working machine, the combination of a bank of rotatable tool carrying spindles, counterbalancing means connected with each of said spindles, means for rotating the spindles, a cam shaft, means for rotating the cam shaft, a rock shaft, a series of counterbalanced levers carried by said rock shaft and connected with said spindles for reciprocating them from the cam shaft, automatic means controlled by the cam shaft for stopping the rotation thereof and the reciprocation of said spindles, manually controlled means for disconnecting the spindles from its reciprocating means, and manually controlled means for stopping the rotation of the spindles.

90. In a metal working machine, the combination of a bank of rotatable tool carrying spindles, counterbalancing means connected with each of said spindles, means for rotating the spindles, a cam shaft, means for rotating the cam shaft, a rock shaft, a series of counterbalanced levers carried by said rock shaft and connected with said spindles for reciprocating them from the cam shaft, automatic means controlled by the cam shaft for stopping the rotation thereof and the reciprocation of said spindles, manually controlled means for disconnecting the spindles from its reciprocating means, manually controlled means for stopping the rotation of the spindles, a horizontally supported rotatable blank carrying turret, means operated from the cam shaft for indexing the turret, and means operated from the cam shaft for locking said turret.

91. In a nut tapping machine, the combination of a horizontally supported rotatable blank carrying turret having a series of spaced, lengthwise extending blank holder recesses, a cam shaft, means operated therefrom for indexing the turret, means operated therefrom for locking the turret, a bank of rotatable counterbalanced tap carrying spindles, means for rotating the spindles, means for manually stopping the rotation of any of the spindles at will, counterbalanced means operated from the cam shaft for reciprocating the spindles simultaneously, manually controlled means for disconnecting any of the spindles from its reciprocating means at will, a worm shaft for rotating said cam shaft, clutch mechanism carried by the worm shaft, and automatic trip mechanism controlled by the cam shaft for automatically disconnecting the clutch mechanism thereby to stop the worm shaft and the cam shaft and the reciprocation of said spindles.

92. In a nut tapping machine, the combination of a horizontally supported rotatable blank carrying turret having a series of spaced, lengthwise extending blank holder recesses, a cam shaft, means operated therefrom for indexing the turret, means operated therefrom for locking the turret, a bank of rotatable counterbalanced tap carrying spindles, means for rotating the spindles, means for manually stopping the rotation of any of the spindles at will, counterbalanced means operated from the cam shaft for reciprocating the spindles simultaneously, manually controlled means for disconnecting any of the spindles from its reciprocating means at will, a worm shaft for rotating said cam shaft, clutch mechanism carried by the worm shaft, and automatic trip mechanism controlled by the cam shaft for automatically disconnecting the clutch mechanism thereby to stop the worm shaft and the cam shaft and the reciprocation of said spindles, said automatic trip mechanism being constructed and timed to stop the rotation of the worm shaft, cam shaft and the reciprocation of the spindles after the predetermined number of reciprocations of said spindles.

93. In a nut tapping machine, the combination of a horizontally supported rotatable blank carrying turret having a series of spaced, lengthwise extending blank holder recesses, a cam shaft, means operated therefrom for indexing the turret, means operated therefrom for locking the turret, a bank of rotatable counterbalanced tap carrying spindles, means for rotating the spindles, means for manually stopping the rotation of any of the spindles at will, counterbalanced means operated from the cam shaft for reciprocating the spindles simultaneously, manually controlled means for disconnecting any of the spindles from its reciprocating means at will, a worm shaft for rotating said cam shaft, clutch mechanism carried by the worm shaft, automatic trip mechanism controlled by the cam shaft for automatically disconnecting the clutch mechanism thereby to stop the worm shaft and the cam shaft and the reciprocation of said spindles, said automatic trip mechanism being constructed and timed to stop the rotation of the worm shaft, cam shaft and the reciprocation of the spindles after a predetermined number of reciprocations of said spindles, and a single source of power for driving the spindle rotating mechanism and therefrom the worm shaft and cam shaft.

94. In a nut tapping machine, the combination of a horizontally supported rotatable blank carrying turret having a series of spaced lengthwise extending blank holder recesses, a cam shaft, means operated therefrom for indexing the turret, means operated therefrom for locking the turret, a bank of rotatable counterbalanced tap carrying spindles, means for rotating the spindles, means for manually stopping the rotation of any of the spindles at will, counterbalanced means operated from the cam shaft for reciprocating the spindles simultaneously, manually controlled means for disconnecting any of the spindles from its reciprocating means at will, a worm shaft for rotating said cam shaft, clutch mechanism carried by the worm shaft, automatic trip mechanism controlled by the cam shaft for automatically disconnecting the clutch mechanism thereby to stop the worm shaft and the cam shaft and the reciprocation of said spindles, said automatic trip mechanism being constructed and timed to stop the rotation of the worm shaft, cam shaft and the reciprocation of the spindles after a predetermined number of reciprocations of said spindles, and a single source of power for driving the spindle rotating mechanism and therefrom the worm shaft and cam shaft and comprising a motor connected with said spindle driving mechanism.

95. In a nut tapping machine, the combination of a horizontally supported rotatable blank carrying turret having a series of lengthwise extending spaced blank holder recesses, a cam shaft, an auxiliary shaft, gearing connecting the cam shaft with the auxiliary shaft, means operated from the auxiliary shaft for indexing the turret, means operated from said auxiliary shaft for locking said turret, a bank of rotatable counterbalanced tool carrying spindles, a rock shaft, a series of counterbalanced levers carried by said rock shaft and operated from said cam shaft for reciprocating the spindles, manually controlled means for disconnecting each of the reciprocating means from its spindle at will, a spindle driving shaft, a series of transverse shafts geared to the spindle driving shaft and geared to the spindles for rotating them, manually controlled means for stopping the rotation of any of the spindles at will, a single source of power connected with the spindle driving shaft for rotating it, an auxiliary shaft geared to the spindle driving shaft, a worm shaft geared to the cam shaft, a system of change gears between said worm shaft and said last auxiliary shaft whereby the worm shaft and cam shaft are driven from the spindle driving shaft, means connected with the worm shaft and controlled by the cam shaft for automatically stopping the rotation of the cam shaft and thereby the reciprocation of the spindles at a predetermined time, and means for manually resetting said automatically operative means.

96. In a nut tapping machine, the combination of a horizontally supported rotatable blank carrying turret having a series of lengthwise extending spaced blank holder recesses, a cam shaft, an auxiliary shaft, gearing connecting the cam shaft with the auxiliary shaft, means operated from the auxiliary shaft for indexing the turret, means operated from said auxiliary shaft for locking said turret, a bank of rotatable counterbalanced tool carrying spindles, a rock shaft, a series of counterbalanced levers carried by said rock shaft and operated from said cam shaft for reciprocating the spindles, manually controlled means for disconnecting each of the reciprocating means from its spindle at will, a spindle driving shaft, a series of transverse shafts geared to the spindle driving shaft and geared to the spindles for rotating them, manually controlled means for stopping the rotation of any of the spindles at will, a single source of power connected with the spindle driving shaft for rotating it, an auxiliary shaft geared to the spindle driving shaft, a worm shaft geared to the cam shaft, a system of change gears between said worm shaft and said last auxiliary shaft whereby the worm shaft and cam shaft are driven from the spindle driving shaft, means connected with the worm shaft and controlled by the cam shaft for automatically stopping the rotation of the cam shaft and thereby the reciprocation of the spindles at a predetermined time and including a system of change gears, and means for manually resetting said automatic means.

97. In a metal working machine, the combination of a rotary blank holder, a rotary shaft, means for indexing said blank holder, a plurality of rotating and reciprocating spindles, means for rotating the spindles, and swinging means operated by said shaft in opposite directions for reciprocating the spindles.

98. In a nut tapping machine, the combination of a rotary blank holding turret, cam shaft mechanism, means controlled thereby for indexing and locking said turret, rotating and reciprocating spindles, means for rotating the spindles, means operated by the cam shaft mechanism for reciprocating the spindles, a single source of power for driving the spindle rotating means and therefrom the cam shaft mechanism, and means constructed and timed for stopping the rotation of the cam shaft mechanism and thereby the indexing of the turret and the reciprocation of the spindles at predetermined times.

99. In a nut tapping machine, the combination of a rotary blank holding turret, cam shaft mechanism, means controlled thereby for indexing and locking said turret, rotating and reciprocating spindles, means for rotating the spindles, means operated by the cam shaft mechanism for reciprocating the spindles, a single source of power for driving the spindle rotating means and therefrom the cam shaft mechanism, and means constructed and timed for stopping the rotation of the cam shaft mechanism and thereby the indexing of the turret and the reciprocation of the spindles at predetermined times, said means being controlled by the cam shaft mechanism whereby the turret will be indexed and the spindles will be reciprocated a predetermined number of times intermediate the stoppage of said cam shaft mechanism.

100. In a nut tapping machine, the combination of a rotary blank holding turret, cam shaft mechanism, means controlled thereby for indexing and locking said turret, rotating and reciprocating spindles, means for rotating the spindles, means operated by the cam shaft mechanism for reciprocating the spindles, a single source of power for driving the spindle rotating means and therefrom the cam shaft mechanism, means constructed and timed for stopping the rotation of the cam shaft mechanism and thereby the indexing of the turret and the reciprocation of the spindles at predetermined times, said means being controlled by the cam shaft mechanism whereby the turret will be indexed and the spindles will be reciprocated a predetermined number of times intermediate the stoppage of said cam shaft mechanism, manually controlled means for stopping the reciprocation of the spindles, and manually controlled means for stopping the rotation of the spindles.

101. In a nut tapping machine, the combination of a rotary blank holding turret, cam shaft mechanism, means controlled thereby for indexing and locking said turret, rotating and reciprocating spindles, means for rotating the spindles, means operated by the cam shaft mechanism for reciprocating the spindles, a single source of power for driving the spindle rotating means and therefrom the cam shaft mechanism, means constructed and timed for stopping the rotating of the cam shaft mechanism and thereby the indexing of the turret and the reciprocation of the spindles at predetermined times, said means being controlled by the cam shaft mechanism whereby the turret will be indexed and the spindles will be reciprocated a predetermined number of times intermediate the stoppage of said cam shaft mechanism, manually controlled means for stopping the reciprocation of the spindles, manually controlled means for stopping the rotation of the spindles, and counterbalancing means effective to prevent the spindles from operating by gravity.

102. In a metal working machine, the combination of an indexible rotary turret supported on a horizontal axis and constructed to receive a plurality of rows of blanks and means for operating simultaneously upon all the blanks in a row and comprising a plurality of rotatable and reciprocal tool carrying spindles, means for indexing the turret and means for rotating and reciprocating the tool spindles.

103. In a metal working machine, the combination of an indexible rotary turret supported on a horizontal axis and constructed to receive a plurality of rows of blanks and means for operating simultaneously upon all the blanks in a row and comprising a plurality of rotatable and reciprocal tool carrying spindles, means for indexing the turret, means for rotating and reciprocating the tool spindles, and means for intermittently stopping the indexing of the turret at a predetermined time.

104. In a metal working machine, the combination of an indexible rotary turret supported on a horizontal axis and constructed to receive a plurality of rows of blanks and means for operating simultaneously upon all the blanks in a row and comprising a plurality of rotatable and reciprocal tool carrying spindles, means for indexing the turret, means for rotating and reciprocating the tool spindles, and means for stopping the reciprocation of the tool spindles at a predetermined time.

105. In a metal working machine, the combination of an indexible rotary turret supported on a horizontal axis and constructed to receive a plurality of rows of blanks and means for operating simultaneously upon all the blanks in a row, and comprising a plurality of rotatable and reciprocal tool carrying spindles, means for indexing the turret, means for rotating and reciprocating the tool spindles, and means for stopping the indexing of the turret and the reciprocation of the tools at a predetermined time.

106. In a metal working machine, the combination of a hollow rotary turret supported on a horizontal axis and adapted to carry blank holders having openings therethrough, said turret having openings through its wall, each registering with an opening of a blank holder whereby the chips will pass through said openings into the interior of the turret, and means for indexing said turret.

107. In a metal working machine, the combination of a hollow rotary turret supported on a horizontal axis and adapted to carry blank holders having openings therethrough, said turret having openings through its wall, each registering with an opening of a blank holder whereby the chips will pass through said openings into the interior of the turret, means for indexing said turret, a plurality of rotatable and reciprocal tool holding spindles for operating upon the blanks carried by the blank holders of the turret and means for reciprocating and rotating said spindles.

108. In a metal working machine, the combination of a rotatable and indexible blank carrying turret supported on a horizontal axis, means on the periphery of said turret for supporting a plurality of blanks, a plurality of rotatable and reciprocal tools for operating upon a plurality of blanks simultaneously at each indexing of the turret, means for intermittently indexing the turret and means for rotating and reciprocating the tool spindles.

Signed at Cleveland, Ohio, this 6th day of January, 1922.

OSCAR A. SMITH.
GEORGE J. LEBER.